(12) United States Patent
Tateyama (10) Patent No.: US 7,646,696 B2
(45) Date of Patent: Jan. 12, 2010

(54) OBJECTIVE OPTICAL ELEMENT AND OPTICAL PICKUP APPARATUS

(75) Inventor: Kiyono Tateyama, Tokyo (JP)

(73) Assignee: Konica Minolta Opto, Inc., Tokyo (JP)

( * ) Notice: Subject to any disclaimer, the term of this patent is extended or adjusted under 35 U.S.C. 154(b) by 590 days.

(21) Appl. No.: 11/075,941

(22) Filed: Mar. 10, 2005

(65) Prior Publication Data
US 2005/0201249 A1 Sep. 15, 2005

(30) Foreign Application Priority Data
Mar. 15, 2004 (JP) ............................... 2004-073025

(51) Int. Cl.
*G11B 7/00* (2006.01)

(52) U.S. Cl. ................. 369/112.08; 369/112.05; 369/112.01; 369/112.07; 369/112.22; 369/112.23

(58) Field of Classification Search ............ 369/112.08, 369/112.05
See application file for complete search history.

(56) References Cited

U.S. PATENT DOCUMENTS

| | | | |
|---|---|---|---|
| 6,834,036 B1 * | 12/2004 | Shiono et al. | 369/112.03 |
| 6,982,838 B2 * | 1/2006 | Maruyama et al. | 359/719 |
| 7,260,047 B2 * | 8/2007 | Nishioka et al. | 369/112.05 |
| 7,324,424 B2 * | 1/2008 | Kim et al. | 369/112.07 |
| 2004/0136309 A1 * | 7/2004 | Arai et al. | 369/112.08 |
| 2005/0201249 A1 * | 9/2005 | Ikenaka | 369/112.01 |
| 2005/0254397 A1 * | 11/2005 | Arai et al. | 369/112.01 |
| 2006/0007837 A1 * | 1/2006 | Arai et al. | 369/112.01 |
| 2006/0104187 A1 * | 5/2006 | Katayama | 369/112.22 |
| 2008/0259767 A1 * | 10/2008 | Mimori et al. | 369/112.05 |

OTHER PUBLICATIONS

JP 2001-060336 Shiono Teruhiro, Jun. 2001, Optical head.*

* cited by examiner

*Primary Examiner*—Wayne R Young
*Assistant Examiner*—Van N Chow
(74) *Attorney, Agent, or Firm*—Finnegan, Henderson, Farabow, Garrett & Dunner, L.L.P.

(57) ABSTRACT

An objective optical element for use in an optical pickup apparatus, includes two or more optical elements having a first surface having a first phase difference providing structure and a second surface having a second phase difference providing structure, wherein each of the first and second phase difference providing structures emit a diffracted light flux corresponding to each of the entering first-third light fluxes, or emit a transmitting light flux which is not applied a diffractive action corresponding to each of the entering first-third light fluxes, and the first-third light fluxes enter into the objective optical element as an almost infinite parallel light flux for information reproducing and/or recording on the first-third optical information recording media respectively.

27 Claims, 3 Drawing Sheets

OBJECTIVE OPTICAL ELEMENT AND OPTICAL PICKUP APPARATUS

FIELD OF THE INVENTION

The present invention relates to an optical pickup apparatus, and particularly, to an optical pickup apparatus by which, on 3 or more different optical information recording media, the recording and/or reproducing of information can be respectively conducted by using light fluxes projected from 3 light sources whose light source wavelengths are different.

BACKGROUND OF THE INVENTION

Recently, in the optical pickup apparatus, the wavelength-shortening of the laser light source used as the light source for reproducing of the information recorded in an optical disk or recording of the information in the optical disk is advanced. For example, a laser light source of wavelength 405 nm such as a blue-violet semiconductor laser, or a blue-violet SHG laser which conducts the wavelength conversion of the infrared semiconductor laser by using the second harmonic wave generation is putting to a practical use.

Using these blue violet laser light sources enables an objective lens with the same numerical aperture (NA) as DVD (Digital Versatile Disk) to record the information of 15-20 GB in an optical disk of diameter 12 cm, and enables an objective lens whose NA is increased to 0.85 to record the information of 23-25 GB in the optical disk of diameter 12 cm. Hereinafter, in the present specification, the optical disk and photomagnetic disk for which the blue violet laser light source is used, are generally referred as "high density optical disk".

Hereupon, only by saying that the information can be adequately recorded and/or reproduced for such a high density optical disk, it is difficult to be said that a value as a product of the optical disk player and/or recorder is enough. In the present time, DVD or CD (Compact Disc) in which various information are recorded is put in a market. When the actuality is based on, by only a case where the information can be recorded and/or reproduced for the high density optical disk, it is insufficient, and for example, a fact that the information can be adequately recorded and/or reproduced also for a user-own DVD or CD, introduces to a fact that a commercial value as the optical disk player and/or recorder is increased. For such a background, it is desirable that the optical pickup apparatus mounted in the optical disk player and/or recorder for the high density optical disk has a performance by which the information can be adequately recorded and/or reproduced while the compatibility is being kept with also any one of 3 kinds of optical disks of the high density optical disk and DVD, and CD.

As a method by which the information can be adequately recorded and/or reproduced while the compatibility is being kept with also any one of the high density optical disk and DVD, furthermore, CD, a method by which an optical system for the high density optical disk and an optical system for DVD or CD are selectively switched corresponding to the recording density of the optical disk for which the information is recorded and/or reproduced, can be considered. However, because a plurality of optical systems are necessary for the method, it is disadvantageous for down-sizing, further, the cost is increased.

Accordingly, for the purpose to intend that the structure of the optical pickup apparatus is simplified and the cost is reduced, it can be said that even in the optical pickup apparatus having the compatibility, it is preferable that the common optical system for the high density optical disk and for DVD or CD is used and the number of parts structuring the optical pickup apparatus are reduced at most. Further, it is most advantageous that the common objective optical system arranged toward the optical disk is used with each other, in the simplification of the structure of the optical pickup apparatus and the cost reduction.

Hereupon, in the case where it is intended to realize the compatibility by using the common objective optical system in the optical pickup apparatus, the light source wavelengths or the protective substrate thicknesses used for respective optical disks are different. Therefore, it is necessary that any idea for forming a light converged spot whose aberration is finely corrected on the information recording surface of the optical disk.

As a mode of the aberration correction, it is considered that an angle of the light flux incident on the objective optical element is changed. According to such a mode of the aberration correction, when a degree of the divergence of the light flux incident on the objective optical element is changed, the aberration correction corresponding to the using optical disk can be conducted (refer to Patent Document 1).

[Patent Document 1] Tokkai No. 2001-60336

However, when the objective optical element is arranged on the common optical path, a design that each of light fluxes of all wavelengths λ1, λ2 and λ3 enters into the objective optical element as an almost infinite parallel light flux for recording and/or reproducing of information, is preferable because the off-axis light performance is increased. Although, in a technology written in Patent Document 1, because the divergent light flux is incident at the time of the information recording and/or reproducing of CD, there is a possibility that that the off-axis light performance is worsened. That is, as larger the degree of the divergence of the incident light flux on the objective optical element is, there is a possibility that the coma is generated larger when the lens shift is conducted at the time of the tracking.

SUMMARY OF THE INVENTION

The present invention is attained in view of problems of the conventional technology, and an object of the invention is to provide an objective optical element and an optical pickup apparatus by which a fine spherical aberration correction can be conducted, even when the light fluxes having 3 different wavelengths are incident.

An objective optical element relating to the present invention is an objective optical element for use in an optical pickup apparatus including three light sources emitting light fluxes with different wavelengths and a light converging system having an objective optical element, for information reproducing and/or recoding. The objective optical element is used in the optical pickup apparatus such that each of the light fluxes with different wavelengths enters into the objective optical element as an almost infinite parallel light flux for information reproducing and/or recording on the corresponding optical information recording medium. The objective optical element is provided with two or more optical elements having a first surface including a first phase difference providing structure and a second surface including a second phase difference providing structure. The first phase difference providing structure has a plurality of ring-shaped zones whose centers are on an optical axis when the first surface is viewed from an optical axis direction. When each of the first-third light fluxes enters into the first phase difference providing structure, the first phase difference providing structure emits a diffracted light flux corresponding to each of the first-third light fluxes, or emits a transmitting light flux which is not applied a diffractive action corresponding to each of the first third light fluxes. The second phase difference providing structure has a plurality of ring-shaped zones whose centers are on an optical axis when the second surface is viewed from an optical axis direction. When each of the first-third light fluxes enters into the second phase difference providing structure, the second phase difference providing structure emits a diffracted light flux corresponding to each of the first-third light fluxes, or emits a transmitting light flux which is not applied a diffractive action flux corresponding to each of the first-third light fluxes.

An objective optical element according to the present invention, for example, when the reproducing and/or recording of the information is conducted on HD, DVD and CD, the light flux of the almost infinite parallel light flux enters in the objective optical element arranged on the common optical path. Therefore, its off-axis light performance can be improved, and the allowance at the time of manufacturing is spread. Further, in the objective optical element according to the present invention, the spherical aberration or the wave-front aberration is corrected by providing the phase differences to the light fluxes having 3 different wavelengths using the phase difference providing structure provided on 2 surfaces. It allows that a power of the phase difference providing structure is small, and the width of ring-shaped band pitch is not decreased too small, and the allowable range of the manufacture is spread, when compared to a case where a single phase difference providing structure is used.

DETAILED DESCRIPTION OF THE INVENTION

A preferred structure of the present invention will be described below.

An objective optical element written in item 1 is an objective optical element used for an optical pickup apparatus provided with a first light source emitting a first light flux with a wavelength $\lambda 1$ for information reproducing and/or recoding, a second light source emitting a second light flux with a wavelength $\lambda 2$ ($0.5 \times \lambda 1 \leq \lambda 2 \leq 0.7 \times \lambda 1$) for information reproducing and/or recording, a third light source emitting a third light flux with a wavelength $\lambda 3$ ($1.8 \times \lambda 1 \leq \lambda 3 \leq 2.2 \times \lambda 1$) for information reproducing and/or recording and a light converging system having an objective optical element. The an objective optical element is used in the optical pickup apparatus for converging the first light flux on information recording-surface of a first optical information recording medium having a protective layer with a thickness t1, for converging the second light flux on information recording surface of a second optical information recording medium having a protective layer with a thickness t2 ($0.9 \times t1 \leq t2 \leq 1.1 \times t1$), and for converging the third light flux on information recording surface of a third optical information recording medium having a protective layer with a thickness t3 ($1.9 \times t1 \leq t3 \leq 2.1 \times t1$). The objective optical element includes two or more optical elements having a first surface including a first phase difference providing structure and a second surface including a second phase difference providing structure. The first phase difference providing structure has a plurality of ring-shaped zones whose centers are on an optical axis when the first surface is viewed from an optical axis direction. The second phase difference providing structure has a plurality of ring-shaped zones whose centers are on an optical axis when the second surface is viewed from an optical axis direction. When each of the first-third light fluxes enters into the first phase difference providing structure, the first phase difference providing structure emits a diffracted light flux corresponding to each of the first-third light fluxes, or emits a transmitting light flux which is not applied a diffractive action corresponding to each of the first-third light fluxes. When each of the first-third light fluxes enters into the second phase difference providing structure, the second phase difference providing structure emits a diffracted light flux corresponding to each of the first-third light fluxes, or emits a transmitting light flux which is not applied a diffractive action flux corresponding to each of the first-third light fluxes. The first light flux enters into the objective optical element as an almost infinite parallel light flux for information reproducing and/or recording on the first optical information recording medium, the second light flux enters into the objective optical element as an almost infinite parallel light flux for information reproducing and/or recording on the second optical information recording medium, and the third light flux enters into the objective optical element as an almost infinite parallel light flux for information reproducing and/or recording on the third optical information recording medium.

According to the structure, when the reproducing and/or recording of the information is conducted for the first optical information recording medium, the second optical information recording medium or the third optical information recording medium, a light flux enters as an almost parallel infinite light flux in the objective optical element arranged on the common optical path from the first light source, second light source, or third light source. Therefore, the off-axis light performance can be improved, and the allowance at the time of manufacturing is spread. Further, in the present invention, the spherical aberration or wave-front aberration is corrected by providing a phase difference to at least 2 light fluxes with wavelengths among the wavelengths $\lambda 1$, $\lambda 2$ and $\lambda 3$, by using the phase difference providing structures provided on 2 surfaces. Therefore, a light converging spot which can reproduce and/or record the information can be formed on the information recording surface also for any one of the first optical information recording medium, the second optical information recording medium, and the third optical information recording medium.

In the objective optical element written in item 2, it is preferable that in the structure written in item 1, each of the first phase difference providing structure and the second phase difference providing structure is a blaze type diffractive structure.

Figure 2:
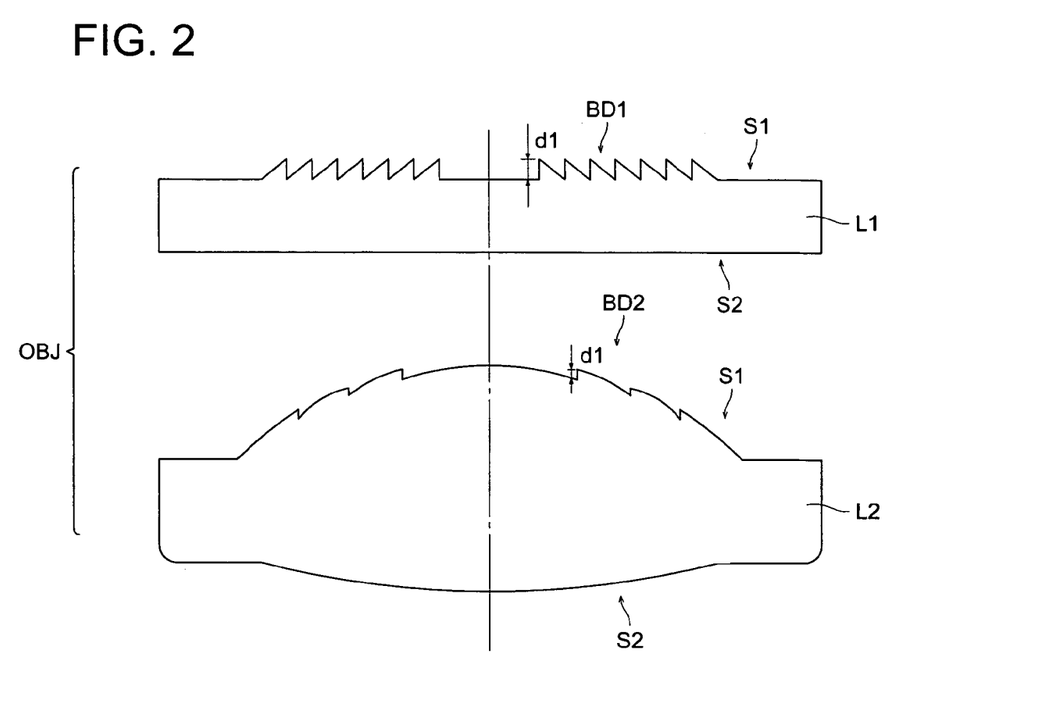
FIG. 2 is an outline sectional view of an objective optical element OBJ.

FIG. 2 is an outline sectional view showing the objective optical element OBJ of the present invention, and the shape of the optical surface is exaggeratingly drawn. The objective optical element OBJ is composed of an optical element L1 and an optical element L2 which are formed of the same plastic material. Hereupon, although the drawing is neglected, it has a flange portion (also called a connecting portion) formed in one body with the optical function section in the periphery of respective optical function sections (an area of an aberration correction element L1 where the first light flux and a light converging element L2 pass through). Because mutual one portions of such a flange portion are jointed (for example, adhered), they are integrated, that is, the interval of them is not changed. When the optical elements L1 and L2 are integrated, both may also be integrated through a lens frame which is a separated member.

On the optical surface S1 (incident surface) on the semiconductor laser light source side of the optical element L1, as shown in FIG. 2, a first blaze type diffractive structure BD1 whose section is serrated shape, is formed. On the one hand, also on the optical surface S1 (incident surface) on the semiconductor laser light source side of the optical element L2, as shown in FIG. 2, a second blaze type diffractive structure BD2 whose section is serrated shape, is formed. The first blaze type diffractive structure BD1, and the second blaze type diffractive structure BD2 give the diffraction action to the light fluxes of transmitting wavelength λ1, λ2, and λ3 and conduct the aberration correction, and all of such a diffraction light are used for conducting the reproducing and/or recording of the information on the first optical information recording medium, the second optical information recording medium, and the third optical information recording medium.

In the present specification, "blaze type diffractive structure" means a diffractive structure whose cross section including an optical axis has a serrated shape and "diffractive structure" means a structure emitting a diffracted light flux which mainly includes a predescribed order and non zero order diffracted light flux. Moreover, it is well known to one skilled in the art that a judgment whether a cross section has a serrated shape is conducted by viewing a serrated shape against an envelop of tooth roots of the shape.

Furthermore, in the present specification, "almost infinite parallel light flux" means that a magnification m of an optical system in which the almost finite parallel light flux enters satisfies $-1/500 \leq m \leq 1/500$.

In the objective optical element written in item 3, it is preferable that in the structure written in item 2, the objective optical element satisfies a following expression, $$5 \times \lambda 1/(n1-1) \leq d1 < 6 \times \lambda 1/(n1-1) \quad (1)$$

wherein n1 is a refractive index for a wavelength λ1 of an optical element having the blaze type diffractive structure among the two or more optical elements, and d1 is a step depth of each of the ring-shaped zones whose step is parallel to an optical axis (refer to FIG. 2).

According to the structure, among diffracted light fluxes with the wavelength λ1 generated by the blaze type diffractive structure having the step difference d1, 5-th order diffracted light flux has the highest diffraction efficiency. Among diffracted light fluxes with the wavelength λ2 generated by the blaze type diffractive structure of the step difference d1, 3-rd order diffracted light flux has the highest diffraction efficiency. Among the diffracted light flux with the wavelength λ3 generated by the blaze type diffractive structure of the step difference d1, 2-nd or 3-rd order diffracted light flux has the highest diffraction efficiency. The recording and/or reproducing of the information is conducted by using this high efficient diffracted light flux, the light flux projected from the light source can be effectively used, and as the result, the optical pickup apparatus by which the power-saving can be intended, can be provided.

In the objective optical element written in item 4, it is preferable that in the structure written in item 2, the objective optical element satisfies a following expression, $$10 \times \lambda 1/(n1-1) \leq d1 < 11 \times \lambda 1/(n1-1) \quad (2)$$

wherein n1 is a refractive index for a wavelength λ1 of an optical element having the blaze type diffractive structure among the two or more optical elements, and d1 is a step depth of each of the ring-shaped zones whose step is parallel to an optical axis (refer to FIG. 2).

According to the structure, among the diffracted light fluxes with the wavelength λ1 generated by the blaze type diffractive structure of the step difference d1, 10-th order diffracted light flux has the highest diffraction efficiency. Among the diffracted light fluxes with the wavelength λ2 generated by the blaze type diffractive structure of the step difference d1, 6-th-order diffracted light flux has the highest diffraction efficiency. Among the diffracted light fluxes with the wavelength λ3 generated by the blaze type diffractive structure of the step difference d1, 5-th order diffracted light flux has the highest diffraction efficiency. When the recording and/or reproducing of the information is conducted by using this high efficient diffracted light flux, the light flux projected from the light source can be effectively used, and as the result, the optical pickup apparatus by which the power-saving can be intended, can be provided.

In the objective optical element written in item 5, it is preferable that, in the structure written in item 2, the objective optical element satisfies a following expression, $$3 \times \lambda 1 (n1-1) \leq d1 < 4 \times \lambda 1/(n1-1) \quad (3)$$

wherein n1 is a refractive index for a wavelength λ1 of an optical element having the blaze type diffractive structure among the two or more optical elements, and d1 is a step depth of each of the ring-shaped zones whose step is parallel to an optical axis (refer to FIG. 2).

According to the structure, among the diffracted light flux with the wavelength λ1 generated by the blaze type diffractive structure of the step difference d1, the 3-rd order diffracted light flux has the highest diffraction efficiency. Among the diffracted light flux with the wavelength λ2 generated by the blaze type diffractive structure of the step difference d1, the 2-nd order diffracted light flux has the highest diffraction efficiency. Among the diffracted light fluxes with the wavelength λ3 generated by the blaze type diffractive structure of the step difference d1, the 1-st or 2-nd order diffracted light flux has the highest diffraction efficiency. When the recording and/or reproducing of the information is conducted by using this high efficient diffracted light flux, the light flux projected from the light source can be effectively used, and as the result, the optical pickup apparatus by which the power-saving can be intended, can be provided.

In the objective optical element written in item 6, it is preferable that in the structure written in item 1, the first phase difference providing structure is a blaze type diffractive structure, the second phase difference providing structure is a transmission type diffractive structure, and the second phase difference providing structure is arranged closer to an optical information recording medium than the first phase difference providing structure.

Figure 3:
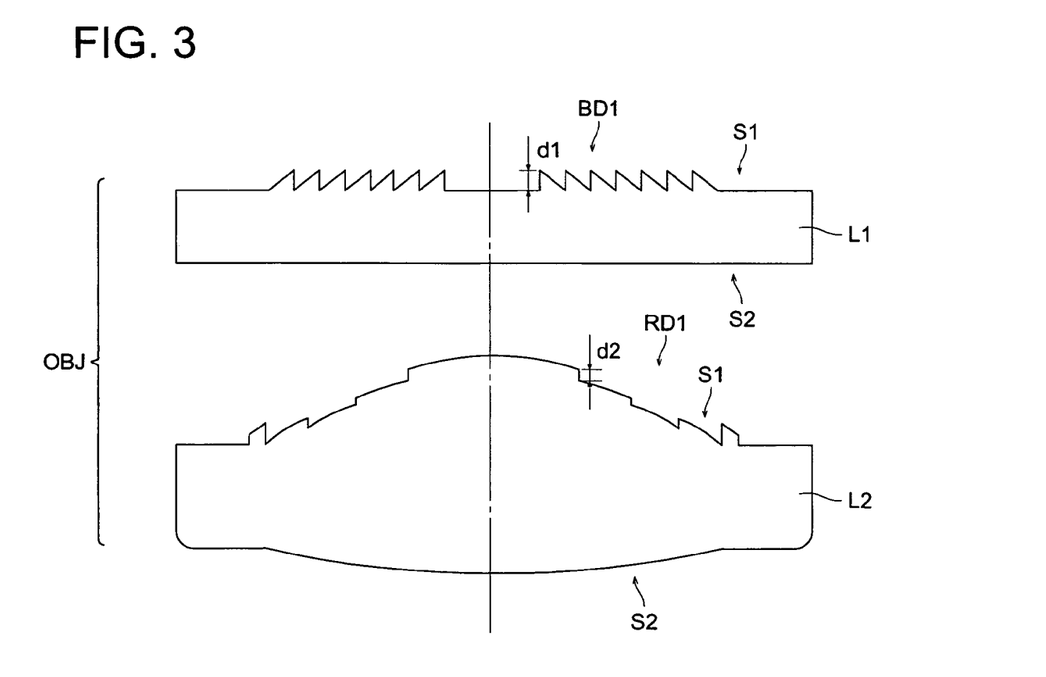
FIG. 3 is an outline sectional view of an objective optical element OBJ.

FIG. 3 is an outline sectional view showing the objective optical element OBJ of the present invention, and, the shape of the optical surface is exaggeratingly drawn. The objective optical element OBJ is composed of an optical element L1 and an optical element L2 which are formed of the same plastic material. Hereupon, although the drawing is neglected, it has a flange portion (also called a connecting portion) formed in one body with the optical function section in the periphery of respective optical function sections (an area of an aberration correction element L1 which is transmitted by the first light flux and a light converging element L2), and when mutual one portions of such a flange portion are jointed (for example, adhered), they are integrated, that is, the interval between them is not changed. When the optical elements L1 and L2 are integrated, both may also be integrated through a lens frame which is a separated member.

On the optical surface S1 (incident surface) on the semiconductor laser light source side of the optical element L1, as shown in FIG. 3, a blaze type diffractive structure BD1 whose cross section is serrated shape, is formed. On the one hand, on the optical surface S1 (incident surface) on the semiconductor laser light source side of the optical element L2, as shown in FIG. 3, a structure RD2 having a plurality of ring-shaped zones is formed concentric circularly to the optical axis. The blaze type diffractive structure BD1 gives the diffraction action to transmitting light fluxes with wavelengths λ1, λ2 and λ3, and conducts the aberration correction. All of such a diffracted light fluxes are used for conducting the reproducing and/or recording of the information on the first optical information recording medium; second optical information recording medium, and third optical information recording medium. Further, the structure RD2 having a plurality of ring-shaped zones gives the phase difference to the transmitting light fluxes with wavelength λ1, λ2 and λ3, and they pass through the structure. All of such a transmitting light fluxes are used for conducting the reproducing and/or recording of the information on the first optical information recording medium, second optical information recording medium, and third optical information recording medium. Hereupon, in the optical element L2, the blaze type diffractive structure may also be provided, and in the optical element L1, the structure having a plurality of ring-shaped zones may also be provided.

In the present specification, "transmitting type phase difference providing structure" means a structure mainly emitting a transmitting light flux which is not a diffracted light flux, among structures emitting light fluxes with phase difference provided (in other words, a structure emitting transmitting light fluxes using refractive action without emitting diffracted light fluxes).

In the objective optical element written in item 7, it is preferable that, in the structure written in item 6, the objective optical element satisfies a following expression, $$5 \times \lambda 1/(n1-1) \leq d1 < 6 \times \lambda 1/(n1-1) \qquad (4)$$

wherein n1 is a refractive index for a wavelength λ1 of an optical element having the blaze type diffractive structure among the two or more optical elements, and d1 is a step depth of each of the ring-shaped zones whose step is parallel to an optical axis (refer to FIG. 3).

According to the structure, among the diffracted light fluxes with the wavelength λ1 generated by the blaze type diffractive structure of the step difference d1, 5-th order diffraction light has the highest diffraction efficiency. Among the diffracted light fluxes with the wavelength λ2 generated by the blaze type diffractive structure of the step difference d1, 3-rd order diffraction light has the highest diffraction efficiency. Among the diffracted light fluxes with the wavelength λ3 generated by the blaze type diffractive structure of the step difference d1, 2-nd or 3-rd order diffraction light has the highest diffraction efficiency. When the recording and/or reproducing of the information is conducted by using this high efficient diffraction light, the light flux projected from the light source can be effectively used, and as the result, the optical pickup apparatus by which the power-saving can be intended, can be provided.

In the objective optical element written in item 8, it is preferable that in the structure written in item 6 or 7, the objective optical element satisfies a following expression, $$1 \times \lambda 1/(n1-1) \leq d1 < 2 \times \lambda 1/(n1-1) \qquad (5)$$

wherein n1 is a refractive index for a wavelength λ1 of an optical element having the blaze type diffractive structure among the two or more optical elements, and d1 is a step depth of each of the ring-shaped zones whose step is parallel to an optical axis (refer to FIG. 3).

According to the structure, the phase difference is not given to the light flux of wavelength λ1 which transmitted the transmission type phase difference providing structure having the step difference d2, the phase difference of almost 0.4×2π or −0.4×2π is given to the light flux of wavelength λ2 which transmitted the transmission type phase difference providing structure having the step difference d2, and the phase difference of about 0.5×2π is given to the light flux of wavelength λ3 which transmitted the transmission type phase difference providing structure having the step difference d2. By using those phase differences, the spherical aberration generated due to the difference of the protective substrate thickness of the optical information recording medium can be corrected.

In the objective optical element written in item 9 is preferable that, wherein the objective optical element satisfies a following expression, $$3 \times \lambda 1/(n1-1) \leq d1 < 4 \times \lambda 1/(n1-1) \qquad (6)$$

wherein n1 is a refractive index for a wavelength λ1 of an optical element having the blaze type diffractive structure among the two or more optical elements, and d1 is a step depth of each of the ring-shaped zones whose step is parallel to an optical axis (refer to FIG. 3).

According to the structure, the phase difference is not given to the light flux of wavelength λ1 which transmitted the transmission type phase difference providing structure having the step difference d2, the phase difference of about 0.2×2π or −0.2×2π is given to the light flux of wavelength λ2 which transmitted the transmission type phase difference providing structure having the step difference d2, and the phase difference of about 0.5×2π is given to the light flux of wavelength λ3 which transmitted the transmission type phase difference providing structure having the step difference d2. By using this phase difference, the spherical aberration generated due to the difference of the protective substrate thickness of the optical information recording medium can be corrected.

In the objective optical element written in item 10, it is preferable that in the structure written in item 1, each of the first phase difference providing structure and the second phase difference providing structure is a transmission type diffractive structure.

Figure 4:
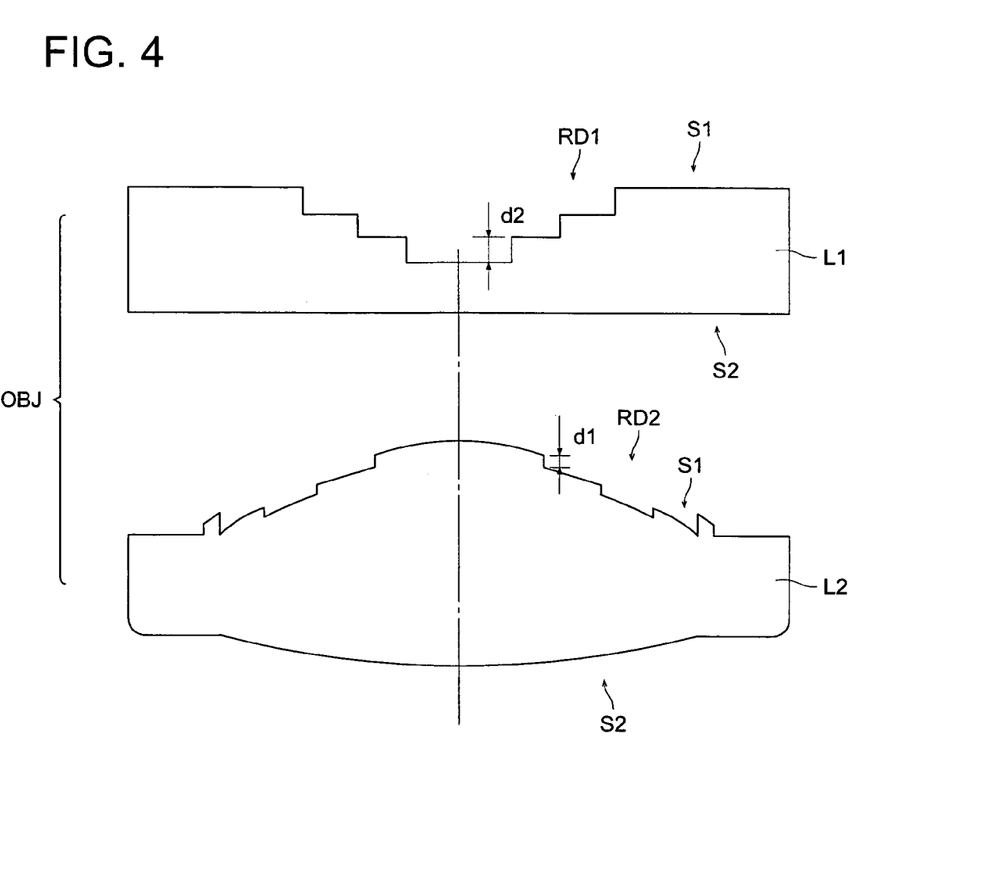
FIG. 4 is an outline sectional view of an objective optical element OBJ.

FIG. 4 is an outline sectional view showing the objective optical element OBJ of the present invention, and, the shape of the optical surface is exaggeratingly drawn. The objective optical element OBJ is composed of an optical element L1 and an optical element L2 which are formed of the same plastic material. Hereupon, although the drawing is neglected, it has a flange portion (also called a connecting portion) formed in one body with the optical function sections in the periphery of respective optical function sections (an area of an aberration correction element L1 which is transmitted by the first light flux and a light converging element L2), and when mutual one portions of such a flange portion are jointed (for example, adhered), they are integrated, that is, the interval between them is not changed. When the optical elements L1 and L2 are integrated, both may also be integrated through a lens frame which is a separated member.

On the optical surface S1 (incident surface) on the semiconductor laser light source side of the optical element L1, as shown in FIG. 4, the structure RD1 having a plurality of ring-shaped zones is formed concentric circularly to the optical axis. On the one hand, on the optical surface S1 (incident surface) on the semiconductor laser light source side of the optical element L2, as shown in FIG. 4, the structure RD2 having a plurality of ring-shaped zones is formed concentric circularly to the optical axis. The structures RD1, RD2 having a plurality of ring-shaped zones give the phase difference to transmitting light fluxes of wavelengths λ1, λ2 and λ3, and transmit them, and all of such a transmission light are used for conducting the reproducing and/or recording of the information on the first optical information recording medium, second optical information recording medium, and third optical information recording medium.

In the objective optical element written in item 11, it is preferable that in the structure written in item 10, the objective optical element satisfies a following expression, $$1 \times \lambda 1/(n1-1) \leq d1 < 2 \times \lambda 1/(n1-1) \tag{8}$$

wherein n1 is a refractive index for a wavelength λ1 of an optical element having the blaze type diffractive structure among the two or more optical elements, and d1 is a step depth of each of the ring-shaped zones whose step is parallel to an optical axis (refer to FIG. 4).

According to the structure, the phase difference is not given to the light flux of wavelength λ1 which transmitted the transmission type phase difference providing structure having the step difference d2, the phase difference of almost 0.4×2π or −0.4×2π is given to the light flux of wavelength λ2 which transmitted the transmission type phase difference providing structure having the step difference d2, and the phase difference of almost 0.5×2π is given to the light flux of wavelength λ3 which transmitted the transmission type phase difference providing structure having the step difference d2. By using this phase difference, the spherical aberration generated due to the difference of the protective substrate thickness of the optical information recording medium can be corrected.

In the objective optical element written in item 12, it is preferable that in the structure written in item 10, the objective optical element satisfies a following expression, $$3 \times \lambda 1/(n1-1) \leq d1 < 4 \times \lambda 1/(n1-1) \tag{9}$$

wherein n1 is a refractive index for a wavelength λ1 of an optical element having the blaze type diffractive structure among the two or more optical elements, and d1 is a step depth of each of the ring-shaped zones whose step is parallel to an optical axis (refer to FIG. 4).

According to the structure, the phase difference is not given to the light flux of wavelength λ1 which transmitted the transmission type phase difference providing structure having the step difference d2, the phase difference of almost 0.2×2π or −0.2×2π is given to the light flux of wavelength λ2 which transmitted the transmission type phase difference providing structure having the step difference d2, and the phase difference of almost 0.5×2π is given to the light flux of wavelength λ3 which transmitted the transmission type phase difference providing structure having the step difference d2. By using this phase difference, the spherical aberration generated due to the difference of the protective substrate thickness of the optical information recording medium can be corrected.

In the objective optical element, it is preferable that a focal length f of the objective optical element for the light flux with the wavelength λ1 is 0.8 mm≦f≦4 mm.

In the objective optical element, it is preferable that the objective optical element forms a light flux with a wavelength λ3 into a converged light spot having a wavefront aberration φ on an information recording surface of the third optical information recording medium and the wavefront aberration φ is 0≦φ≦0.06 rms.

In the objective optical element written in item 13, it is preferable that in the structure written in any one of items 1-12, at least one of the two or more optical elements is formed of a plastic material.

In the objective optical element written in item 14, it is preferable that, in the structure written in any one of items 1-13, the two or more optical elements are formed of a same material.

The objective optical element written in item 15 is preferable that, in the structure written in any one of items 1-14, the two or more optical elements are arranged so that relative interval between the two or more optical elements is constant at the time of use of the optical pickup apparatus.

In the objective optical element written in item 16, it is preferable that, in the structure written in any one of items 1-15, the two or more optical elements are integrated in one body by being adhered through a connecting portion.

In the objective optical element written in item 17 is preferable that, in the structure written in any one of items 1-16, one of the first phase difference providing structure and the second phase difference providing structure corrects a chromatic aberration generated when the light flux of the wavelength λ1 enters into the objective optical element.

In the objective optical element, it is preferable that the first optical information recording medium includes two information recording surfaces arranged at an interval of ΔL along an optical axis, and ΔL satisfies 0.015 mm≦ΔL≦0.030 mm.

In the objective optical element it is preferable that the second light source emitting the second light flux and the third light source emitting the third light flux are packaged in one light source unit.

In the objective optical element it is preferable that all of light sources of the first light source, the second light source and the third light source are packaged in one light source unit.

In the objective optical element written in item 18, it is preferable that in the structure written in any one of items 1-17, the objective optical element prevents the light flux of the wavelength λ3 entering outside of a numerical aperture which is necessary for information reproducing and/or recording on the third optical information medium using the light flux of the wavelength λ3, from converging.

An optical pickup apparatus written in item 19 is an optical pickup apparatus which is provided with a first light source emitting a first light flux with a wavelength λ1 for information reproducing and/or recoding, a second light source emitting a second light flux with a wavelength λ2 (0.5×λ1≦λ2≦0.7×λ1) for information reproducing and/or recording, a third light source emitting a third light flux with a wavelength λ3 (1.8×λ1≦λ3≦2.2×λ1) for information reproducing and/or recording and a light converging system having an objective optical element of any one of Items 1-18. The light converging system is for converging the first light flux on information recording surface of a first optical information recording medium having a protective layer with a thickness t1, converging the second light flux on information recording surface of a second optical information recording medium having a protective layer with a thickness t2 (0.9×t1≦t2≦1.1×t1), and converging the third light flux on information recording surface of a third optical information recording medium having a protective layer with a thickness t3 (1.9×t1≦t3≦2.1×t1. Herein at least two of the first light source, the second light source and the third light source are packaged in one light source unit.

The effect of the structure is the same as the invention written in item 1.

In the pickup apparatus written in item 20, it is preferable that, in the structure written in item 19, the first optical information recording medium includes two information recording surfaces arranged at an interval of ΔL along an optical axis, and ΔL satisfies 0.015 mm≦ΔL≦0.030 mm.

In the pickup apparatus written in item 21, it is preferable that, in the structure written in any one of items 19-20, the second light source emitting the second light flux and the third light source emitting the third light flux are packaged in one light source unit.

In the pickup apparatus written in item 22, it is preferable that, in the structure written in any one of items 19-21, the first light source, the second light source and the third light source are packaged in one light source unit.

Further, another optical pickup apparatus relating to the present invention is an optical pickup apparatus which has the first light source of the wavelength $\lambda 1$, the second light source of the wavelength $\lambda 2$ ($0.5 \times \lambda 1 \leq \lambda 2 \leq 0.7 \times \lambda 1$), the third light source of the wavelength $\lambda 3$ ($1.8 \times \lambda 1 \leq \lambda 3 \leq 2.2 \times \lambda 1$), and a light converging optical system including the objective optical element. The apparatus conducts the reproducing and/or recording of the information by using the light flux emitted from the first light source on the information recording surface of the first optical information recording medium of the protective substrate thickness t1, the reproducing and/or recording of the information by using the light flux emitted from the second light source on the information recording surface of the second optical information recording medium of the protective substrate thickness t2 ($0.9 \times t1 \leq t2 \leq 1.1 \times t1$), and the reproducing and/or recording of the information by using the light flux emitted from the third light source on the information recording surface of the third optical information recording medium of the protective substrate thickness t3 ($1.9 \times t1 \leq t3 \leq 2.1 \times t1$) The optical pickup apparatus is structured in such a manner that, when the reproducing and/or recording of the information is conducted for the first optical information recording medium, a light flux emitted by the first light source enters into the objective optical element as an almost parallel infinite light flux, when the reproducing and/or recording of the information is conducted for the second optical information recording medium, a light flux emitted by the second light source enters into the objective optical element as an almost parallel infinite light flux, and when the reproducing and/or recording of the information is conducted for the third optical information recording medium, a light flux emitted by the third light source enters into the objective optical element as an almost parallel infinite light flux. The objective optical element includes two or more optical elements having a first surface including a first phase difference providing structure and a second surface including a second phase difference providing structure. The first phase difference providing structure has a plurality of ring-shaped zones whose centers are on an optical axis when the first surface is viewed from an optical axis direction and the second phase difference providing structure has a plurality of ring-shaped zones whose centers are on an optical axis when the second surface is viewed from an optical axis direction.

When each of the first-third light fluxes enters into the first phase difference providing structure, the first phase difference providing structure emits a diffracted light flux corresponding to each of the first-third light fluxes, or emits a transmitting light flux which is not applied a diffractive action corresponding to each of the first-third light fluxes. When each of the first-third light fluxes enters into the second phase difference providing structure, the second phase difference providing structure emits a diffracted light flux corresponding to each of the first-third light fluxes, or emits a transmitting light flux which is not applied a diffractive action flux corresponding to each of the first-third light fluxes.

The effect of the present invention is the same as the invention written in item 1.

In the optical pickup apparatus, it is preferable that each of the first phase difference providing structure and the second phase difference providing structure is a blaze type diffractive structure.

In the optical pickup apparatus, it is preferable that when a refractive index for a wavelength $\lambda 1$ of an optical element having the blaze type diffractive structure among the two or more optical elements is n1, in the blaze type diffractive structure, the step difference d1 parallel to the optical axis of each ring-shaped zone surface satisfies the following expression.

$$5 \times \lambda 1/(n1-1) \leq d1 < 6 \times \lambda 1/(n1-1) \quad (1)$$

In the optical pickup apparatus, it is preferable that when a refractive index for a wavelength $\lambda 1$ of an optical element having the blaze type diffractive structure among the two or more optical elements is n1, in the blaze type diffractive structure, the step difference d1 parallel to the optical axis of each ring-shaped zone surface satisfies the following expression.

$$10 \times \lambda 1/(n1-1) \leq d1 < 11 \times \lambda 1/(n1-1) \quad (2)$$

In the optical pickup apparatus, it is preferable that when a refractive index for a wavelength $\lambda 1$ of an optical element having the blaze type diffractive structure among the two or more optical elements is n1, in the blaze type diffractive structure, the step difference d1 parallel to the optical axis of each ring-shaped zone surface satisfies the following expression.

$$3 \times \lambda 1/(n1-1) \leq d1 < 4 \times \lambda 1/(n1-1) \quad (3)$$

In the optical pickup apparatus, it is preferable that the first phase difference providing structure is a blaze type diffractive structure, the second phase difference providing structure is a transmission type diffractive structure, and the second phase difference providing structure is arranged closer to an optical information recording medium than the first phase difference providing structure.

In the optical pickup apparatus, it is preferable that when a refractive index for a wavelength $\lambda 1$ of an optical element having the blaze type diffractive structure among the two or more optical elements is n1, in the blaze type diffractive structure, the step difference d1 parallel to the optical axis of each ring-shaped zone surface satisfies the following expression.

$$5 \times \lambda 1/(n1-1) \leq d1 < 6 \times \lambda 1/(n1-1) \quad (4)$$

In the optical pickup apparatus, it is preferable that when a refractive index for a wavelength $\lambda 1$ of an optical element having the blaze type diffractive structure among the two or more optical elements is n1, the step difference d2 parallel to the optical axis of the transmission type phase difference providing structure satisfies the following expression.

$$1 \times \lambda 1/(n1-1) \leq d2 < 2 \times \lambda 1/(n1-1) \quad (5)$$

In the optical pickup apparatus, it is preferable that when a refractive index for a wavelength $\lambda 1$ of an optical element having the blaze type diffractive structure among the two or more optical elements is n1, the step difference d2 parallel to the optical axis of the transmission type phase difference providing structure satisfies the following expression.

$$3 \times \lambda 1/(n1-1) \leq d2 < 4 \times \lambda 1/(n1-1) \quad (6)$$

In the optical pickup apparatus, it is preferable that each of the first phase difference providing structure and the second phase difference providing structure is a transmission type diffractive structure.

In the optical pickup apparatus, it is preferable that when a refractive index for a wavelength λ1 of an optical element having the blaze type diffractive structure among the two or more optical elements n1, the step difference d2 parallel to the optical axis of the transmission type phase difference providing structure satisfies the following expression.

$$1 \times \lambda 1/(n1-1) \leq d2 \times 2 \times \lambda 1/(n1-1) \tag{8}$$

In the optical pickup apparatus, it is preferable that when a refractive index for a wavelength λ1 of an optical element having the blaze type diffractive structure among the two or more optical elements n1, the step difference d2 parallel to the optical axis of the transmission type phase difference providing structure satisfies the following expression.

$$3 \times \lambda 1/(n1-1) \leq d2 < 4 \times \lambda 1/(n1-1) \tag{9}$$

In the optical pickup apparatus, it is preferable that the focal length f of the objective optical element for the light flux with the wavelength λ1 is 0.8 mm≦f≦4 mm.

In the optical pickup apparatus, it is preferable that the objective optical element forms a light flux with a wavelength λ3 into a converged light spot having a wavefront aberration φ on an information recording surface of the third optical information recording medium and the wavefront aberration φ is 0≦φ≦0.06 rms.

In the optical pickup apparatus it is preferable that at least one of the two or more optical elements is formed of a plastic material.

In the optical pickup apparatus it is preferable that all of the two or more optical elements are formed of a same material.

In the optical pickup apparatus it is preferable that the two or more optical elements are arranged so that relative interval between the two or more optical elements is constant at the time of use of the optical pickup apparatus.

In the optical pickup apparatus it is preferable that the two or more optical elements are integrated in one body by being adhered through a connecting portion.

In the optical pickup apparatus it is preferable that one of the first phase difference providing structure and the second phase difference providing structure corrects a chromatic aberration when the first light flux enters into the objective optical element.

In the optical pickup apparatus it is preferable that the first optical information recording medium includes two information recording surfaces arranged at an interval of ΔL along an optical axis, and ΔL satisfies 0.015 mm≦ΔL≦0.030 mm.

In the optical pickup apparatus it is preferable that the second light source emitting the second light flux and the third light source emitting the third light flux are packaged in one light source unit.

In the optical pickup apparatus it is preferable that the first light source, the second light source and the third light source are packaged in one light source unit.

In the optical pickup apparatus it is preferable that one of the first phase difference providing structure and the second phase difference providing structure makes the third light flux entering outside of a numerical aperture which is necessary for information reproducing and/or recording on the third optical information medium using the third light flux, into a flare light.

In the present specification, "flare light" is a light flux which is formed not to contribute to formation of a spot which is necessary for recording or reproducing on a prescribed information recording surface and passes outside of a prescribed numerical aperture. For example, in the case of recording or reproducing for CD, the flare light generates wavefront aberration of 0.07 λrms (in this case, λ is a wavelength in using CD) or more for the incident light flux corresponding to the higher numerical aperture than the numerical aperture 0-0.43 or 0.45 which is necessary for recording or reproducing of the CD. "make to flare light" means to provide an incident light flux a property so as to make the incident light flux into a light flux with the above described aberration when the incident light irradiates onto the information recording surface.

In the present specification, the objective optical element indicates, in a narrow sense, an optical element having the light converging action arranged opposite to the optical information recording medium at a position on most optical information recording medium side under the condition that the optical information recording medium is loaded in the optical pickup apparatus, and in a broad sense, an optical element which can actuate at least in its optical axis direction by an actuator together with the optical element.

In the present specification, the first optical information recording medium indicates the optical disk (for example, HD, DVD) in which the recording/reproducing of the information is conducted by the objective optical element of NA 0.65 to 0.67, and the optical disk of a standard in which the thickness of the protective layer is about 0.6 mm. The second optical information recording medium includes the optical disks of each kind of DVD series, other than DVD-ROM, DVD-Video, which are exclusively used for the reproducing, such as DVD-RAM which is used for both reproducing/recording, DVD-R, DVD-RW. Further, the third optical information recording medium indicates optical disks of CD series such as CD-R, CD-RW. Hereupon, in the present specification, the thickness of the protective substrate (called also protective layer) is defined that it includes also thickness 0 mm.

According to the present invention, an objective optical element by which the fine spherical aberration correction can be conducted even when light fluxes having 3 different wavelengths are incident, can be provided.

Figure 1:
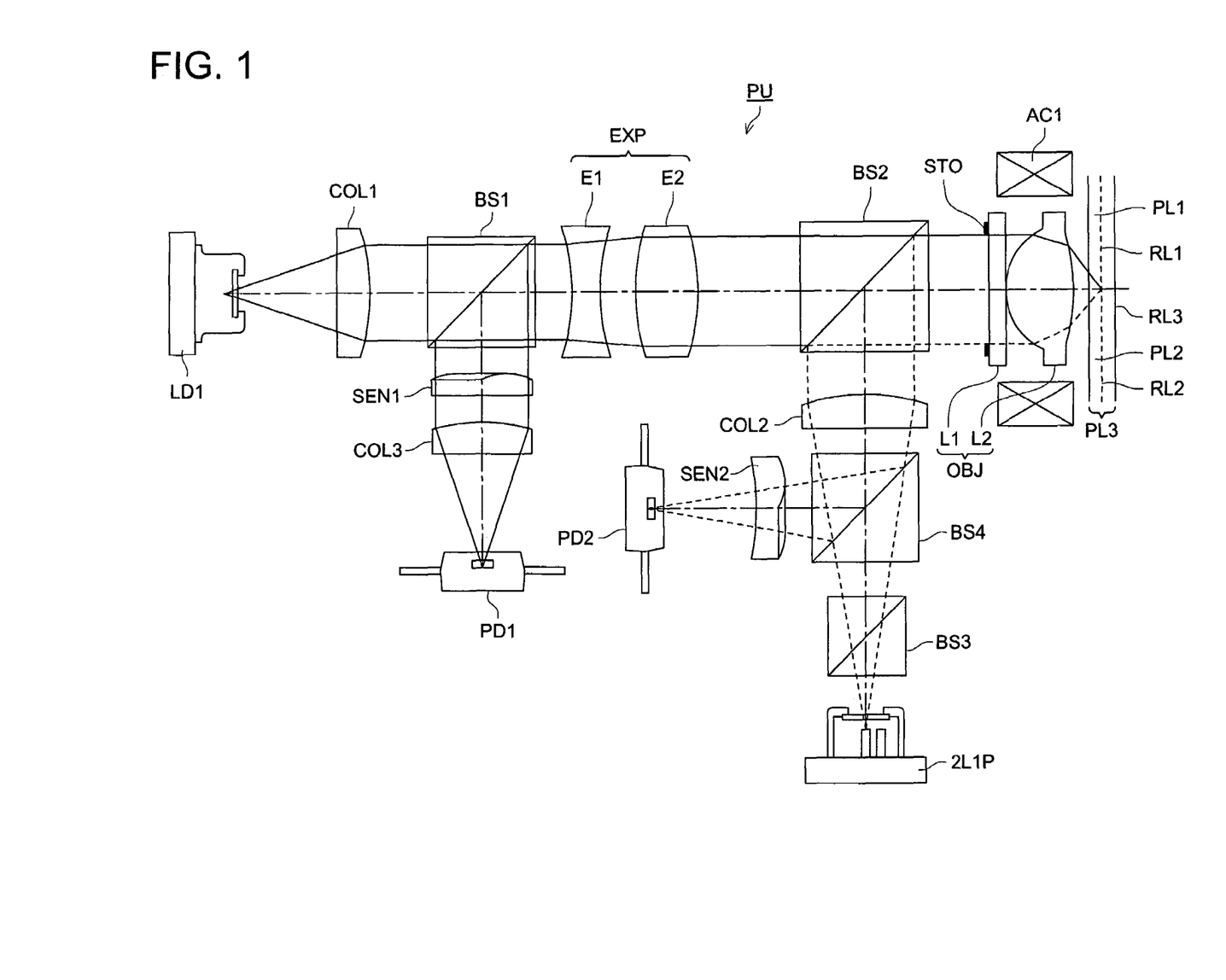
FIG. 1 is an outline sectional view of an optical pickup apparatus according to the present embodiment.

Referring to the drawings, an embodiment of the present invention will be described below. FIG. 1 is a view schematically showing a structure of the first optical pickup apparatus PU by which the recording/reproducing of the information can be adequately conducted also for any one of the high density optical disk HD (the first optical disk), DVD (the second optical disk) and CD (the third optical disk).

EXAMPLES

The optical pickup apparatus PU is generally structured by: a laser unit 2L1P in which a blue violet semiconductor laser LD1 (the first light source) which is light emitted when the recording/reproducing of the information is conducted on the high density optical disk HD and which projects a laser light flux (the first light flux) of 408 nm, the red semiconductor laser (the second light source) which is light emitted when the recording/reproducing of the information is conducted on DVD and which projects a laser light flux (the second light flux) of 658 nm, and the infrared semiconductor laser (the third light source) which is light emitted when the recording/reproducing of the information is conducted on CD and which projects a laser light flux (the third light flux) of 785 nm, are housed in one package (however, the second light source and the third light source may be respectively housed in separated packages); the first light detector PD1 which light receives the reflected light flux from the information recording surface RL1 of the high density optical disk HD; the second light detector PD2 which light receives the reflected light fluxes from the information recording surface RL2 of DVD, and the information recording surface RL3 of CD; the objective optical element OBJ (an element shown in any one of FIGS. 2-4) composed of the aberration correction element L1 (the first optical element) and the light converging element L2 both surfaces of which are aspheric surfaces, having a function by which the laser light fluxes transmitted this aberration correction element L1 are light converged on the information recording surfaces RL1, RL2, RL3; 2-axis actuator AC1; a stop STO corresponding to the numerical aperture NA1 of the high density optical disk HD; a beam expander EXP composed of optical elements E1, E2; the first-fourth polarizing beam splitters BS1-BS4; the first-third collimator lenses COL1-COL3; the first sensor lens SEN1; and the second sensor lens SEN2.

In the optical pickup apparatus PU, when the recording/reproducing of the information is conducted on the high density optical disk HD, as its light path is drawn by a solid line in FIG. 1, the blue violet semiconductor laser LD1 is light emitted. The divergent light flux projected from the blue violet semiconductor laser LD1 transmits the first polarizing beam splitter BS1 after it is converted into the parallel light flux by the first collimator lens COL1, and after the chromatic aberration is corrected by the beam expander EXP (instead of the beam expander EXP, the chromatic aberration may also be corrected by the first collimator lens COL1), and after it transmits the second polarizing beam splitter BS2, the light flux diameter is regulated by the stop STO, and becomes a spot formed on the information recording surface RL1 through the first protective layer PL1 by the objective optical element OBJ. Hereupon, an action given by the objective optical element OBJ to the light flux of the wavelength λ1 will be described later. The objective optical element OBJ conducts the focusing or tracking by the 2-axis actuator AC1 arranged in its periphery.

After the reflected light flux modulated by the information pit on the information recording surface RL1, transmits again the objective optical element OBJ, the second polarizing beam splitter BS2, and the beam expander EXP, reflected by the first polarizing beam splitter BS1, and the astigmatism is given by the sensor lens SEN1, it is converted into the converging light flux by the third collimator lens COL3, and converged on the light receiving surface of the first light detector PD1. Then, by using the output signal of the first light detector PD1, the information recorded in the high density optical disk HD can be read.

Further, when the recording/reproducing of the information is conducted on DVD, initially, the second light source of the laser unit 2L1P is light emitted. The divergent light flux projected from the laser unit 2L1P transmits, as its light path is drawn by a dotted line in FIG. 1, the third polarizing beam splitter, the fourth beam splitter, and after it is made into the parallel light flux by the second collimator lens COL2, reflected by the second polarizing beam splitter BS2, and becomes a spot formed on the information recording surface RL2 through the second protective layer PL2 by the objective optical element OBJ. Hereupon, the action given to the light flux of the wavelength λ2 by the objective optical element OBJ will be described later. The objective optical element OBJ conducts the focusing or tracking by the 2-axis actuator AC1 arranged in its periphery. The reflected light flux modulated by the information pit on the information recording surface RL2, transmits again the objective optical element OBJ, reflected by the second polarizing beam splitter BS2, and converted into the converging light flux by the second collimator lens COL2, reflected by the fourth polarizing beam splitter BS4, and the astigmatism is given by the second sensor lens SEN2, and it is converged on the light receiving surface of the second light detector PD2. Then, by using the output signal of the second light detector PD2, the information recorded in DVD can be read.

Further, when the recording/reproducing of the information is conducted on CD, the third light source of the laser unit 2L1P is light emitted. The divergent light flux projected from the laser unit 2L1P transmits, although it is not drawn, the third polarizing beam splitter, the fourth polarizing beam splitter, and after it is made into the parallel light flux by the second collimator lens COL2, reflected by the second polarizing beam splitter BS2, and becomes a spot formed on the information recording surface RL3 through the third protective layer PL3 by the objective optical element OBJ. Hereupon, the action given to the light flux of the wavelength λ3 by the objective optical element OBJ will be described later. The objective optical element OBJ conducts the focusing or tracking by the 2-axis actuator AC1 arranged in its periphery, and the wave-front aberration $\phi$ is made so that it is within the range of $0 \leq \phi \leq 0.06$ λrms. The reflected light flux modulated by the information pit on the information recording surface RL3, transmits again the objective optical element OBJ, reflected by the second polarizing beam splitter BS2, and converted into the converging light flux by the second collimator lens COL2, reflected by the fourth polarizing beam splitter BS4, and the astigmatism is given by the second sensor lens SEN2, and it is converged on the light receiving surface of the second light detector PD2. Then, by using the output signal of the second light detector PD2, the information recorded in CD can be read.

Hereupon, in the present embodiment, the objective optical element OBJ is 2-group composition composed of the optical element L1 and the optical element L2. Hereby, although there is an advantage that the diffraction power or refraction power can be allotted to 2 optical elements, and the degree of freedom of the design work is improved, it is not limited to this, the objective optical element OBJ is composed of a single lens, and the phase difference providing structure may also be provided on the incident surface and the projecting surface of this lens.

Further, although the aperture limit can also be conducted by the phase difference providing structure, when a dichroic filter or liquid crystal phase control element is attached to the optical element constituting the objective optical element OBJ, an aperture limiting function may also be given to the objective optical element. Hereupon, although the drawing is neglected, when the optical pickup apparatus PU shown in the above embodiment, a rotation drive device for rotatably holding the optical disk, and a control device for controlling the drive of each kind of these devices, are mounted, the optical information recording reproducing apparatus by which at least one of the recording of the optical information for the optical disks and the reproducing of the information recorded in the optical disks can be conducted, can be obtained.

Example 1

Next, the example will be described. Example 1 is an example corresponding to the objective optical element OBJ shown in FIG. 2, that is, an example in which the blaze type diffractive structures are provided on the optical surface on the light source side of the optical element L1 and the optical surface on the light source side of the optical element L2. The lens data will be shown in Tables 1-1 and 1-2. In Tables 1-1 and 1-2, ri is a radius of curvature, di is a position in the optical axis direction from the i-th surface to the (i+1)-th surface, and ni expresses the refractive index of each surface. Hereinafter (including the lens data in Table), the exponent of 10 (for example, $2.5 \times 10^{-3}$) is expressed by using E (for example, 2.5×E-3). Hereupon, in the present example, when the blazed wavelength of the blaze type diffractive structure is λB=407 nm, the step difference d1 closest to the optical axis is 7.3 μm on S2 surface, and 3.8 μm on S4 surface.

TABLE 1-1

Example 1
Lens data
Focal length of the objective lens:
$f_1 = 3.0$ mm $f_2 = 3.10$ mm $f_3 = 3.14$ mm
Image surface side numerical aperture:
NA1: 0.65 NA2: 0.65 NA2: 0.51
S2 surface diffraction order:
n1: 10 n2: 6 n3: 5
S4 surface diffraction order:
n1: 5 n2: 3 n3: 2

| i-th surface | ri | di (407 nm) | ni (407 nm) | di (655 nm) | ni (655 nm) | di (785 nm) | ni (785 nm) |
|---|---|---|---|---|---|---|---|
| 0 |  | ∞ |  | ∞ |  | ∞ |  |
| 1 (stop diameter) | ∞ | 0.1 (φ3.9 mm) |  | 0.1 (φ4.03 mm) |  | 0.1 (φ3.2 mm) |  |
| 2 | 7.38169 | 1.00 | 1.559806 | 1.00 | 1.540725 | 1.00 | 1.537237 |
| 3 | 11.06860 | 0.05 | 1.0 | 0.05 | 1.0 | 0.05 | 1.0 |
| 4 | 1.93574 | 2.20 | 1.559806 | 2.20 | 1.540725 | 2.20 | 1.537237 |
| 5 | 876.10560 | 1.01 | 1.0 | 1.09 | 1.0 | 0.74 | 1.0 |
| 6 | ∞ | 0.60 | 1.61869 | 0.60 | 1.57752 | 1.20 | 1.57063 |
| 7 | ∞ |  |  |  |  |  |  |

*di expresses a dislocation from the i-th surface to the (i + 1)-th surface.

TABLE 1-2

Aspheric surface data

The 2-nd surface

Aspheric surface coefficient

| κ | −1.1983 × E+1 | | |
|---|---|---|---|
| A1 | +1.2754 × E−4 | P1 | 4.0 |
| A2 | +1.8571 × E−4 | P2 | 6.0 |
| A3 | +1.5556 × E−5 | P3 | 8.0 |
| A4 | +1.3344 × E−5 | P4 | 10.0 |

Optical path difference function (λB = 1 mm)

| C2 | −3.1351 |
|---|---|
| C4 | −3.5417 × E−1 |
| C6 | +1.9452 × E−2 |
| C8 | +5.4178 × E−3 |
| C10 | −1.7510 × E−3 |

The 3-rd surface

Aspheric surface coefficient

| κ | −1.5583 × E+1 | | |
|---|---|---|---|
| A1 | −1.5836 × E−3 | P1 | 4.0 |
| A2 | 3.7381 × E−4 | P2 | 6.0 |
| A3 | 2.0409 × E−5 | P3 | 8.0 |
| A4 | −1.5015 × E−5 | P4 | 10.0 |

The 4-th surface

Aspheric surface coefficient

| κ | −2.7519 × E−1 | | |
|---|---|---|---|
| A1 | +2.3072 × E−3 | P1 | 4.0 |

TABLE 1-2-continued

Aspheric surface data

| A2 | +3.9833 × E−4 | P2 | 6.0 |
|---|---|---|---|
| A3 | +2.2529 × E−4 | P3 | 8.0 |
| A4 | +9.7739 × E−6 | P4 | 10.0 |
| A5 | +1.2411 × E−5 | P5 | 12.0 |

TABLE 1-2-continued

Aspheric surface data

| A6 | −3.8210 × E−7 | P6 | 14.0 |
|---|---|---|---|

Optical path difference function (λB = 1 mm)

| C2 | −2.6197 |
|---|---|
| C4 | +7.9612 × E−1 |
| C6 | +1.4030 × E−1 |
| C8 | +1.2172 × E−2 |
| C10 | +7.7875 × E−3 |

The 5-th surface

Aspheric surface coefficient

| κ | +5.0000 | | |
|---|---|---|---|
| A1 | +2.3965 × E−2 | P1 | 4.0 |
| A2 | −1.5875 × E−2 | P2 | 6.0 |
| A3 | +1.4311 × E−2 | P3 | 8.0 |
| A4 | −8.5712 × E−3 | P4 | 10.0 |
| A5 | +2.6806 × E−3 | P5 | 12.0 |
| A6 | −3.3806 × E−4 | P6 | 14.0 |

Hereupon, the incident surface (the 4-th surface) and the projecting surface (the 5-th surface) are formed into the aspheric surfaces which are axial symmetric around the optical axis, respectively regulated by the equation in which the coefficients shown in Tables 1-1 and 1-2 are substituted into Math-1.

(Math-1)
Equation of the Aspheric Surface Shape $$X(h) = \frac{(h^2/R)}{1+\sqrt{1-(1+\kappa)(h/R)^2}} + \sum_{i=1}^{9} A_i h^{p_i}$$

Herein, X(h) is the axis of the optical axis direction (the advancing direction of the light is positive), $\kappa$ is a conical coefficient, $A_i$ is an aspherical coefficient, and h is the height from the optical axis.

Further, the optical path length given to the light flux of each wavelength by the first diffractive structure is regulated by the equation in which the coefficients shown in Table 1 are substituted into the optical path difference function of Math-2.

(Math-2)
Optical Path Difference Function $$\phi(h) = \sum_{i=1}^{5} C_{2i} h^{2i}$$

$C_{2i}$ is a coefficient of the optical path difference function.

Example 2

Also Example 2 is an example corresponding to the objective opticl element OBJ shown in FIG. 2, that is, an example that the blaze type diffractive structure is provided on the optical surface on the light source side of the optical element L1, and on the optical surface on the light source side of the optical element L2. The lens data will be shown in Tables 2-1 and 2-2. The shapes of the aspheric surface and the diffractive structure follows Math-1, Math-2. Hereupon, the present example, when the blazed wavelength of the blaze type diffractive structure is $\lambda B=407$ nm, the step difference d1 closest to the optical axis is 2.2 μm on S2 surface, and 3.8 μm on S4 surface.

TABLE 2-2

Aspheric surface data

The 2-nd surface

Aspheric surface coefficient

| | | | |
|---|---|---|---|
| κ | −9.4807 | | |
| A1 | +4.2900 × E−4 | P1 | 4.0 |
| A2 | +4.4716 × E−4 | P2 | 6.0 |
| A3 | +8.8466 × E−5 | P3 | 8.0 |
| A4 | +4.9734 × E−6 | P4 | 10.0 |

Optical path difference function ($\lambda B = 1$ mm)

| | |
|---|---|
| C2 | −5.2341 |
| C4 | −3.0573 × E−1 |
| C6 | +9.9057 × E−3 |
| C8 | +8.0282 × E−3 |
| C10 | −4.6114 × E−4 |

The 3-rd surface

Aspheric surface coefficient

| | | | |
|---|---|---|---|
| κ | −8.2095 | | |
| A1 | −1.1475 × E−3 | P1 | 4.0 |
| A2 | +6.1794 × E−4 | P2 | 6.0 |
| A3 | +1.1898 × E−4 | P3 | 8.0 |
| A4 | +1.6962 × E−5 | P4 | 10.0 |

The 4-th surface

Aspheric surface coefficient

| | | | |
|---|---|---|---|
| κ | −2.7386×E−1 | | |
| A1 | +1.6286 × E−3 | P1 | 4.0 |
| A2 | +3.7416 × E−4 | P2 | 6.0 |
| A3 | +2.7564 × E−4 | P3 | 8.0 |
| A4 | +1.6501 × E−5 | P4 | 10.0 |
| A5 | +1.5446 × E−5 | P5 | 12.0 |
| A6 | +1.8070 × E−6 | P6 | 14.0 |

Optical path difference function ($\lambda B = 1$ mm)

| | |
|---|---|
| C2 | −3.4243 |
| C4 | +6.1425 × E−1 |
| C6 | +1.0805 × E−1 |

TABLE 2-1

Example 2
Lens data
Focal length of the objective lens:
$f_1 = 3.0$ mm $f_2 = 3.09$ mm $f_3 = 3.12$ mm
Image surface side numerical aperture:
NA1: 0.65 NA2: 0.65 NA2: 0.51
S2 surface diffraction order:
n1: 3 n2: 2 n3: 2
S4 surface diffraction order:
n1: 5 n2: 3 n3: 2

| i-th surface | ri | di (407 nm) | ni (407 nm) | di (655 nm) | ni (655 nm) | di (785 nm) | ni (785 nm) |
|---|---|---|---|---|---|---|---|
| 0 | ∞ | | | ∞ | | ∞ | |
| 1 (stop diameter) | ∞ | 0.1 (φ3.9 mm) | | 0.1 (φ4.03 mm) | | 0.1 (φ3.18 mm) | |
| 2 | 10.83189 | 1.00 | 1.559806 | 1.00 | 1.540725 | 1.00 | 1.537237 |
| 3 | 18.61703 | 0.05 | 1.0 | 0.05 | 1.0 | 0.05 | 1.0 |
| 4 | 1.84030 | 2.20 | 1.559806 | 2.20 | 1.540725 | 2.20 | 1.537237 |
| 5 | 39.76967 | 1.06 | 1.0 | 1.12 | 1.0 | 0.75 | 1.0 |
| 6 | ∞ | 0.60 | 1.61869 | 0.60 | 1.57752 | 1.20 | 1.57063 |
| 7 | ∞ | | | | | | |

*di expresses a dislocation from the i-th surface to the (i + 1)-th surface.

TABLE 2-2-continued

Aspheric surface data

| C8  | $+1.4829 \times E-2$ |
| C10 | $+1.2851 \times E-2$ |

The 5-th surface

Aspheric surface coefficient

| κ  | $-100$ | | |
|----|--------|----|------|
| A1 | $+3.2708 \times E-2$ | P1 | 4.0 |
| A2 | $-1.5092 \times E-2$ | P2 | 6.0 |
| A3 | $+1.2938 \times E-2$ | P3 | 8.0 |
| A4 | $-8.6767 \times E-3$ | P4 | 10.0 |
| A5 | $+2.7973 \times E-3$ | P5 | 12.0 |
| A6 | $-3.3806 \times E-4$ | P6 | 14.0 |

Example 3

Example 3 is an example corresponding to the objective optical element OBJ shown in FIG. 3, that is, an example that the blaze type diffractive structure is provided on the optical surface on the light source side of the optical element L1, and the transmission type phase difference providing structure is provided on the optical surface on the light source side of the optical element L2. The lens data will be shown in Tables (4-1) through (4-4), (5-1) through (5-4).

TABLE 4-1

4-th Surface Data

| Ring No. | HN | HM | A0 | A2 | A4 | A6 |
|---|---|---|---|---|---|---|
| 1 | 0 | 0.168578 | 0 | 0.228329 | 0.007818 | 0.000664 |

| Ring No. | HN | HM | $a_i$ | $b_i$ | $r_i$ |
|---|---|---|---|---|---|
| 2  | 0.16858 | 0.23814 | −0.00058 | 2.199585 | 2.198877 |
| 3  | 0.23814 | 0.29134 | −0.00128 | 2.206246 | 2.204849 |
| 4  | 0.29134 | 0.33604 | −0.00212 | 2.212825 | 2.210757 |
| 5  | 0.33604 | 0.3753  | −0.00308 | 2.219323 | 2.216603 |
| 6  | 0.3753  | 0.41067 | −0.00415 | 2.225712 | 2.222417 |
| 7  | 0.41067 | 0.44309 | −0.00531 | 2.232152 | 2.228178 |
| 8  | 0.44309 | 0.47318 | −0.00656 | 2.238506 | 2.233933 |
| 9  | 0.47318 | 0.50134 | −0.00789 | 2.244834 | 2.239677 |
| 10 | 0.50134 | 0.52789 | −0.00926 | 2.251001 | 2.245276 |
| 11 | 0.52789 | 0.55306 | −0.01076 | 2.575357 | 2.251086 |
| 12 | 0.55306 | 0.57704 | −0.0123  | 2.26358  | 2.256779 |
| 13 | 0.57704 | 0.59996 | −0.01389 | 2.269742 | 2.262425 |
| 14 | 0.59996 | 0.62194 | −0.01559 | 2.276036 | 2.268227 |
| 15 | 0.62194 | 0.64308 | −0.01727 | 2.282048 | 2.273752 |
| 16 | 0.64308 | 0.66347 | −0.01912 | 2.288401 | 2.279653 |
| 17 | 0.66347 | 0.68316 | −0.02095 | 2.294534 | 2.275341 |
| 18 | 0.68316 | 0.70222 | −0.02284 | 2.300618 | 2.290994 |
| 19 | 0.70222 | 0.72069 | −0.02487 | 2.306977 | 2.296956 |
| 20 | 0.72069 | 0.73863 | −0.02693 | 2.313276 | 2.302874 |
| 21 | 0.73863 | 0.75607 | −0.02904 | 2.319531 | 2.308763 |
| 22 | 0.75607 | 0.77304 | −0.03111 | 2.325505 | 2.314371 |
| 23 | 0.77304 | 0.78957 | −0.03344 | 2.332082 | 2.320641 |
| 24 | 0.78957 | 0.8057  | −0.03571 | 2.338322 | 2.32657  |
| 25 | 0.8057  | 0.82144 | −0.03803 | 2.344584 | 2.332539 |
| 26 | 0.82144 | 0.83682 | −0.04051 | 2.351104 | 2.338806 |
| 27 | 0.83682 | 0.85185 | −0.04299 | 2.357502 | 2.344961 |
| 28 | 0.85185 | 0.86656 | −0.04549 | 2.363823 | 2.351051 |
| 29 | 0.86656 | 0.88096 | −0.04816 | 2.370446 | 2.357488 |
| 30 | 0.88096 | 0.89507 | −0.05085 | 2.376976 | 2.363843 |
| 31 | 0.89507 | 0.9089  | −0.05355 | 2.383415 | 2.370118 |
| 32 | 0.9089  | 0.92245 | −0.05643 | 2.390169 | 2.376758 |
| 33 | 0.92245 | 0.93576 | −0.05933 | 2.39685  | 2.383338 |
| 34 | 0.93576 | 0.94882 | −0.0623  | 2.403576 | 2.389987 |
| 35 | 0.94882 | 0.96164 | −0.06524 | 2.410138 | 2.396476 |

TABLE 4-1-continued

4-th Surface Data note:
HN: the height of the start of the ring-shaped zone,
NM: the height of the end of the ring-shaped zone.

TABLE 4-2

| Ring No. | HN | HM | $a_i$ | $b_i$ | $r_i$ |
|---|---|---|---|---|---|
| 36 | 0.96164 | 0.97423 | −0.06846 | 2.417195 | 2.403532 |
| 37 | 0.97423 | 0.89662 | −0.07165 | 2.424091 | 2.41043  |
| 38 | 0.98662 | 0.99879 | −0.0748  | 2.430798 | 2.41714  |
| 39 | 0.99879 | 1.01076 | −0.07825 | 2.438019 | 2.424442 |
| 40 | 1.01076 | 1.02253 | −0.08132 | 2.444398 | 2.430824 |
| 41 | 1.02253 | 1.03412 | −0.08495 | 2.451791 | 2.438362 |
| 42 | 1.03412 | 1.04553 | −0.0883  | 2.458554 | 2.445213 |
| 43 | 1.04553 | 1.05676 | −0.09248 | 2.4668   | 2.453761 |
| 44 | 1.05676 | 1.06783 | −0.096   | 2.473699 | 2.460809 |
| 45 | 1.06783 | 1.07873 | −0.1001  | 2.481605 | 2.469021 |
| 46 | 1.07873 | 1.08947 | −0.10396 | 2.488979 | 2.476652 |
| 47 | 1.08947 | 1.10005 | −0.10791 | 2.496425 | 2.484387 |
| 48 | 1.10005 | 1.11049 | −0.11204 | 2.504111 | 2.49242  |
| 49 | 1.11049 | 1.12078 | −0.11639 | 2.512099 | 2.500822 |
| 50 | 1.12078 | 1.13093 | −0.1206  | 2.519741 | 2.508852 |
| 51 | 1.13093 | 1.14095 | −0.12503 | 2.527705 | 2.517275 |
| 52 | 1.14095 | 1.15082 | −0.12962 | 2.535852 | 2.527937 |
| 53 | 1.15082 | 1.16057 | −0.13421 | 2.543923 | 2.534534 |
| 54 | 1.16057 | 1.17019 | −0.13872 | 2.551771 | 2.542895 |
| 55 | 1.17019 | 1.17969 | −0.14339 | 2.559811 | 2.551505 |
| 56 | 1.17969 | 1.18907 | −0.1486  | 2.568659 | 2.561084 |
| 57 | 1.18907 | 1.19833 | −0.15322 | 2.576458 | 2.56946  |
| 58 | 1.19833 | 1.20748 | −0.1588  | 2.585738 | 2.579601 |
| 59 | 1.20748 | 1.21651 | −0.16397 | 2.594285 | 2.588908 |
| 60 | 1.21651 | 1.22544 | −0.16936 | 2.603084 | 2.598538 |
| 61 | 1.22544 | 1.23425 | −0.17471 | 2.611785 | 2.608047 |
| 62 | 1.23425 | 1.24297 | −0.18036 | 2.620812 | 2.618033 |
| 63 | 1.24297 | 1.25158 | −0.18502 | 2.628277 | 2.626151 |
| 64 | 1.25158 | 1.26009 | −0.19187 | 2.639012 | 2.638201 |
| 65 | 1.26009 | 1.26851 | −0.19682 | 2.646798 | 2.646748 |
| 66 | 1.26851 | 1.27683 | −0.20392 | 2.657737 | 2.659108 |
| 67 | 1.27683 | 1.28505 | −0.21011 | 2.667214 | 2.669742 |
| 68 | 1.28505 | 1.29319 | −0.21643 | 2.676828 | 2.68057  |
| 69 | 1.29319 | 1.30123 | −0.22286 | 2.686512 | 2.691512 |
| 70 | 1.30123 | 1.30919 | −0.22944 | 2.696345 | 2.702664 |
| 71 | 1.30919 | 1.31706 | −0.2361  | 2.706231 | 2.71391  |
| 72 | 1.31706 | 1.32485 | −0.24294 | 2.716293 | 2.7254   |
| 73 | 1.32485 | 1.33256 | −0.2482  | 2.724034 | 2.734076 |
| 74 | 1.33256 | 1.34018 | 0.25698  | 2.736699 | 2.748814 |
| 75 | 1.34018 | 1.34773 | −0.26274 | 2.745038 | 2.758273 |

TABLE 4-3

| Ring No. | HN | HM | $a_i$ | $b_i$ | $r_i$ |
|---|---|---|---|---|---|
| 76 | 1.34773 | 1.35519 | −0.27186 | 2.757976 | 2.773424 |
| 77 | 1.35519 | 1.36259 | −0.27933 | 2.768545 | 2.78569  |
| 78 | 1.36259 | 1.3699  | −0.28719 | 2.779577 | 2.798562 |
| 79 | 1.3699  | 1.37715 | −0.29332 | 2.788197 | 2.808466 |
| 80 | 1.37715 | 1.38432 | −0.30173 | 2.799845 | 2.822162 |
| 81 | 1.38432 | 1.39142 | −0.30962 | 2.810706 | 2.834911 |
| 82 | 1.39142 | 1.39845 | −0.31671 | 2.820452 | 2.846293 |
| 83 | 1.39845 | 1.40541 | −0.32833 | 2.836102 | 2.86511  |
| 84 | 1.40541 | 1.41231 | −0.33663 | 2.847296 | 2.878377 |
| 85 | 1.41231 | 1.41914 | −0.34497 | 2.858469 | 2.891648 |
| 86 | 1.41914 | 1.4259  | −0.35516 | 2.871976 | 2.9079   |
| 87 | 1.4259  | 1.4326  | −0.36412 | 2.883806 | 2.922069 |
| 88 | 1.4326  | 1.43924 | −0.37397 | 2.896713 | 2.937639 |
| 89 | 1.43924 | 1.44582 | −0.38188 | 2.90707  | 2.949999 |
| 90 | 1.44582 | 1.45234 | −0.39389 | 2.92256  | 2.968934 |
| 91 | 1.45234 | 1.4588  | −0.40412 | 2.935714 | 2.984931 |
| 92 | 1.4588  | 1.4652  | −0.41459 | 2.94909  | 3.00125  |
| 93 | 1.4652  | 1.47154 | −0.4254  | 2.962818 | 3.01806  |

TABLE 4-3-continued

| Ring No. | HN | HM | $a_i$ | $b_i$ | $r_i$ |
|---|---|---|---|---|---|
| 94 | 1.47154 | 1.47783 | −0.43208 | 2.97138 | 3.028256 |
| 95 | 1.47783 | 1.48406 | −0.44293 | 2.985026 | 3.045022 |
| 96 | 1.48406 | 1.49023 | −0.45935 | 3.005395 | 3.070523 |
| 97 | 1.49023 | 1.49635 | −0.4712 | 3.020082 | 3.088732 |
| 98 | 1.49635 | 1.50242 | −0.48313 | 3.03478 | 3.106997 |
| 99 | 1.50242 | 1.50844 | −0.49571 | 3.050187 | 3.126225 |
| 100 | 1.50844 | 1.51441 | −0.50388 | 3.060256 | 3.13853 |
| 101 | 1.51441 | 1.52032 | −0.52251 | 3.082706 | 3.167042 |
| 102 | 1.52032 | 1.52619 | −0.53474 | 3.097453 | 3.185539 |
| 103 | 1.52619 | 1.53201 | −0.55051 | 3.116288 | 3.209443 |
| 104 | 1.53201 | 1.53778 | −0.56347 | 3.131741 | 3.228953 |
| 105 | 1.53778 | 1.5435 | −0.58066 | 3.152029 | 3.254881 |
| 106 | 1.5435 | 1.54917 | −0.5865 | 3.15909 | 3.263389 |
| 107 | 1.54917 | 1.5548 | −0.59964 | 3.174563 | 3.28303 |
| 108 | 1.5548 | 1.56039 | −0.61444 | 3.191869 | 3.305142 |
| 109 | 1.56039 | 1.56593 | −0.63038 | 3.210403 | 3.328931 |
| 110 | 1.56593 | 1.57142 | −0.6463 | 3.228819 | 3.352615 |
| 111 | 1.57142 | 1.57688 | −0.65351 | 3.237318 | 3.363103 |
| 112 | 1.57688 | 1.58229 | −0.67145 | 3.257895 | 3.389748 |
| 113 | 1.58229 | 1.58765 | −0.68816 | 3.276997 | 3.414473 |
| 114 | 1.58765 | 1.59298 | −0.70363 | 3.294629 | 3.437271 |
| 115 | 1.59298 | 1.59827 | −0.72932 | 3.323543 | 3.475296 |

TABLE 4-4

| Ring No. | HN | HM | $a_i$ | $b_i$ | $r_i$ |
|---|---|---|---|---|---|
| 116 | 1.59827 | 1.60351 | −0.7471 | 3.43563 | 3.501423 |
| 117 | 1.60351 | 1.60872 | −0.76514 | 3.63772 | 3.527855 |
| 118 | 1.60872 | 1.61389 | −0.78402 | 3.84832 | 3.555488 |
| 119 | 1.61389 | 1.61901 | −0.79878 | 3.401313 | 3.576962 |
| 120 | 1.61901 | 1.62411 | −0.82284 | 3.427851 | 3.612129 |
| 121 | 1.62441 | 1.62916 | −0.84103 | 3.447919 | 3.638565 |
| 122 | 1.62916 | 1.63417 | −0.85765 | 3.466216 | 3.662628 |
| 123 | 1.63417 | 1.63915 | −0.88491 | 3.495903 | 3.702284 |
| 124 | 1.63915 | 1.6441 | −0.90369 | 3.516374 | 3.729413 |
| 125 | 1.6441 | 1.64901 | −0.92831 | 3.543014 | 3.76504 |
| 126 | 1.64901 | 1.65388 | −0.94699 | 3.563241 | 3.791925 |
| 127 | 1.65388 | 1.65872 | −0.97462 | 3.592873 | 3.831787 |
| 128 | 1.65872 | 1.66353 | −0.98334 | 3.602463 | 3.844101 |
| 129 | 1.66353 | 1.6683 | −1.02293 | 3.644503 | 3.901203 |
| 130 | 1.6683 | 1.67304 | −1.04931 | 3.672513 | 3.939031 |
| 131 | 1.67304 | 1.67774 | −1.07614 | 3.700905 | 3.977451 |
| 132 | 1.67774 | 1.68242 | −1.09339 | 3.719235 | 4.001972 |
| 133 | 1.68242 | 1.68706 | −1.12892 | 3.756482 | 4.052803 |
| 134 | 1.68706 | 1.69167 | −1.15419 | 3.782994 | 4.088786 |
| 135 | 1.69167 | 1.69625 | −1.18751 | 3.817713 | 4.136263 |
| 136 | 1.69625 | 1.7008 | −1.21904 | 3.850472 | 4.181084 |
| 137 | 1.7008 | 1.70532 | −1.24931 | 3.881838 | 4.224027 |
| 138 | 1.70532 | 1.70981 | −1.28183 | 3.915413 | 4.270126 |
| 139 | 1.70981 | 1.71427 | −1.31474 | 3.949291 | 4.316719 |
| 140 | 1.71427 | 1.7187 | −1.34984 | 3.985284 | 4.36635 |
| 141 | 1.7187 | 1.7231 | −1.38426 | 4.020486 | 4.414941 |
| 142 | 1.7231 | 1.72748 | −1.41697 | 4.053866 | 4.461032 |
| 143 | 1.72748 | 1.73182 | −1.45833 | 4.095857 | 1.519331 |
| 144 | 1.73182 | 1.73614 | −1.48959 | 4.127608 | 4.563245 |
| 145 | 1.73614 | 1.74043 | −1.51008 | 4.14855 | 4.591904 |
| 146 | 1.74043 | 1.7447 | −1.57944 | 4.218147 | 4.689521 |
| 147 | 1.7447 | 1.74894 | −1.61718 | 4.256099 | 4.742408 |
| 148 | 1.74894 | 1.75315 | −1.65879 | 4.297795 | 4.800675 |

TABLE 5-1

| Ring No. | h [mm] | The distance (mm) of $s_i$ ring-shaped zone surface to $S_{i-1}$ ring-shaped zone surface at a position of height h |
|---|---|---|
| 1 | 1.16858 | −0.00073 |
| 2 | 0.23814 | −0.00073 |
| 3 | 0.29134 | −0.00073 |
| 4 | 0.33604 | −0.00073 |
| 5 | 0.3753 | −0.00073 |
| 6 | 0.41067 | −0.00074 |
| 7 | 0.44309 | −0.00074 |
| 8 | 0.47318 | −0.00074 |
| 9 | 0.50134 | −0.00074 |
| 10 | 0.52789 | −0.00074 |
| 11 | 0.55306 | −0.00074 |
| 12 | 0.57704 | −0.00074 |
| 13 | 0.59996 | −0.00074 |
| 14 | 0.62194 | −0.00075 |
| 15 | 0.64308 | −0.00075 |
| 16 | 0.66347 | −0.00075 |
| 17 | 0.68316 | −0.00075 |
| 18 | 0.70222 | −0.00075 |
| 19 | 0.72069 | −0.00075 |
| 20 | 0.73863 | −0.00075 |
| 21 | 0.75607 | −0.00076 |
| 22 | 0.77304 | −0.00076 |
| 23 | 0.78957 | −0.00076 |
| 24 | 0.8057 | −0.00076 |
| 25 | 0.82144 | −0.00076 |
| 26 | 0.83682 | −0.00076 |
| 27 | 0.85185 | −0.00076 |
| 28 | 0.86656 | −0.00077 |
| 29 | 0.88096 | −0.00077 |
| 30 | 0.89507 | −0.00077 |
| 31 | 0.9089 | −0.00077 |
| 32 | 0.92245 | −0.00077 |
| 33 | 0.93576 | −0.00077 |
| 34 | 0.94882 | −0.00077 |
| 35 | 0.96164 | −0.00078 |

TABLE 5-2

| Ring No. | h [mm] | The distance (mm) of $s_i$ ring-shaped zone surface to $S_{i-1}$ ring-shaped zone surface at a position of height h |
|---|---|---|
| 36 | 0.97423 | −0.00078 |
| 37 | 0.98662 | −0.00078 |
| 38 | 0.99879 | −0.00078 |
| 39 | 1.01076 | −0.00078 |
| 40 | 1.02253 | −0.00078 |
| 41 | 1.03412 | −0.00078 |
| 42 | 1.04553 | −0.00079 |
| 43 | 1.05676 | −0.00079 |
| 44 | 1.06783 | −0.00079 |
| 45 | 1.07873 | −0.00079 |
| 46 | 1.08947 | −0.00079 |
| 47 | 1.10005 | −0.00079 |
| 48 | 1.11049 | −0.00079 |
| 49 | 1.12078 | −0.00079 |
| 50 | 1.13093 | −0.00080 |
| 51 | 1.14095 | −0.00080 |
| 52 | 1.15082 | −0.00080 |
| 53 | 1.16057 | −0.00080 |
| 54 | 1.17019 | −0.00080 |
| 55 | 1.17969 | −0.00080 |
| 56 | 1.18907 | −0.00080 |
| 57 | 1.19833 | −0.00081 |
| 58 | 1.20748 | −0.00081 |
| 59 | 1.21651 | −0.00081 |
| 60 | 1.22544 | −0.00081 |
| 61 | 1.23425 | −0.00081 |
| 62 | 1.24297 | −0.00081 |
| 63 | 1.25158 | −0.00081 |

TABLE 5-2-continued

| Ring No. | h [mm] | The distance (mm) of $S_i$ ring-shaped zone surface to $S_{i-1}$ ring-shaped zone surface at a position of height h |
|---|---|---|
| 64 | 1.26009 | −0.00082 |
| 65 | 1.26851 | −0.00082 |
| 66 | 1.27683 | −0.00082 |
| 67 | 1.28505 | −0.00082 |
| 68 | 1.29319 | −0.00082 |
| 69 | 1.30123 | −0.00082 |
| 70 | 1.30919 | −0.00082 |

TABLE 5-3

| Ring No. | h [mm] | The distance (mm) of $S_i$ ring-shaped zone surface to $S_{i-1}$ ring-shaped zone surface at a position of height h |
|---|---|---|
| 71 | 1.31706 | −0.00083 |
| 72 | 1.32485 | −0.00083 |
| 73 | 1.33256 | −0.00083 |
| 74 | 1.64018 | −0.00083 |
| 75 | 1.34773 | −0.00083 |
| 76 | 1.35519 | −0.00083 |
| 77 | 1.36259 | −0.00083 |
| 78 | 1.3699 | −0.00083 |
| 79 | 1.37715 | −0.00084 |
| 80 | 1.68432 | −0.00084 |
| 81 | 1.39142 | −0.00084 |
| 82 | 1.39845 | −0.00084 |
| 83 | 1.40541 | −0.00084 |
| 84 | 1.41231 | −0.00084 |
| 85 | 1.41914 | −0.00084 |
| 86 | 1.4259 | −0.00085 |
| 87 | 1.4326 | −0.00085 |
| 88 | 1.43924 | −0.00085 |
| 89 | 1.44582 | −0.00085 |
| 90 | 1.45234 | −0.00085 |
| 91 | 1.4588 | −0.00085 |
| 92 | 1.4652 | −0.00085 |
| 93 | 1.47154 | −0.00085 |
| 94 | 1.47783 | −0.00086 |
| 95 | 1.48406 | −0.00086 |
| 96 | 1.49023 | −0.00086 |
| 97 | 1.49635 | −0.00086 |
| 98 | 1.50242 | −0.00086 |
| 99 | 1.50844 | −0.00086 |
| 100 | 1.51441 | −0.00086 |
| 101 | 1.52032 | −0.00086 |
| 102 | 1.52619 | −0.00087 |
| 103 | 1.53201 | −0.00087 |
| 104 | 1.53778 | −0.00087 |
| 105 | 1.5435 | −0.00087 |
| 106 | 1.54917 | −0.00087 |
| 107 | 1.5548 | −0.00087 |
| 108 | 1.56039 | −0.00087 |
| 109 | 1.56593 | −0.00087 |
| 110 | 1.57142 | −0.00087 |
| 111 | 1.57688 | −0.00088 |
| 112 | 1.58229 | −0.00088 |
| 113 | 1.58765 | −0.00088 |
| 114 | 1.59298 | −0.00088 |
| 115 | 1.59827 | −0.00088 |
| 116 | 1.60351 | −0.00088 |
| 117 | 0.60872 | −0.00088 |
| 118 | 1.61389 | −0.00088 |
| 119 | 1.61901 | −0.00088 |
| 120 | 1.62411 | −0.00088 |
| 121 | 1.62916 | −0.00089 |
| 122 | 1.63417 | −0.00089 |
| 123 | 1.63915 | −0.00089 |
| 124 | 1.6441 | −0.00089 |

TABLE 5-3-continued

| Ring No. | h [mm] | The distance (mm) of $S_i$ ring-shaped zone surface to $S_{i-1}$ ring-shaped zone surface at a position of height h |
|---|---|---|
| 125 | 1.64901 | −0.00089 |
| 126 | 1.65388 | −0.00089 |
| 127 | 1.65872 | −0.00089 |
| 128 | 1.66353 | −0.00089 |
| 129 | 1.6683 | −0.00089 |
| 130 | 1.67304 | −0.00089 |
| 131 | 1.67774 | −0.00089 |
| 132 | 1.68242 | −0.00090 |
| 133 | 1.68706 | −0.00090 |
| 134 | 1.69167 | −0.00090 |
| 135 | 1.69625 | −0.00090 |
| 136 | 1.7008 | −0.00090 |
| 137 | 1.70532 | −0.00090 |
| 138 | 1.70981 | −0.00090 |
| 139 | 1.71427 | −0.00090 |
| 140 | 1.7187 | −0.00090 |
| 141 | 1.7231 | −0.00090 |
| 142 | 1.72748 | −0.00090 |
| 143 | 1.73182 | −0.00090 |
| 144 | 1.73614 | −0.00090 |
| 145 | 1.74043 | −0.00090 |
| 146 | 1.7447 | −0.00091 |
| 147 | 1.74894 | −0.00091 |

The aspheric surface shape and the optical path difference providing shape follow Math-1, Math-2, however, in the ring-shaped zone like structure, a protrusion amount x in the optical axis direction of 1st ring-shaped zone is found by Math-3, and a protrusion amount x in the optical axis direction of ring-shaped zones from $2^{nd}$ to $140^{th}$ is found by Math-4 (however, the protrusion to the light source side is shown in a negative). However, h is the height from the optical axis. Hereupon, in present Example, when the blazed wavelength of the blaze type diffractive structure is λB=407 nm, the step difference d1 closes to the optical axis is 7.3 μm, and the step difference d2 of the transmission type refraction structure is 7.3 μm.

(Math-3)
The representative expression of the first ring-shaped zone $$X = A_0 + A_2 \times h^2 + A_4 \times h^4 + A_6 \times h^6$$

(Math-4)
The representative expression of the $2^{nd}$-$140^{th}$ ring-shaped zones $$x = \frac{(h-a_i)^2 / r_i}{1 + \sqrt{1 - (h-a_i)^2 / r_i^2}} + b_i - r_i$$

Suffix i is a ring-shaped zone number.

Hereupon, when HD, DVD are so-called 2-layer structure having 2 information recording surfaces separately arranged in the optical axis direction, the interval ΔL between information recording surfaces is 0.015≦ΔL≦0.030 mm, however, when the interval between element E1, E2, of the beam expander EXP is changed, the recording and/or reproducing of the information can be conducted also for any information recording surface.

What is claimed is:
1. An objective element for use in an optical pickup apparatus including a first light source emitting a first light flux with a wavelength λ1 for information reproducing and/or recoding, a second light source emitting a second light flux with a wavelength λ2 for information reproducing and/or recording, a third light source emitting a third light flux with a wavelength λ3 for information reproducing and/or recording and a light converging system having an objective optical element, for converging the first light flux on information recording surface of a first optical information recording medium having a protective layer with a thickness t1, converging the second light flux on information recording surface of a second optical information recording medium having a protective layer with a thickness t2, and converging the third light flux on information recording surface of a third optical information recording medium having a protective layer with a thickness t3, the objective optical element comprising:

two or more optical elements having a first surface including a first phase difference providing structure and a second surface including a second phase difference providing structure, the first phase difference providing structure has a plurality of ring-shaped zones whose centers are on an optical axis when the first surface is viewed from an optical axis direction and the second phase difference providing structure has a plurality of ring-shaped zones whose centers are on an optical axis when the second surface is viewed from an optical axis direction;

wherein the first light flux enters into the objective optical element as an almost infinite parallel light flux for information reproducing and/or recording on the first optical information recording medium, the second light flux enters into the objective optical element as an almost infinite parallel light flux for information reproducing and/or recording on the second optical information recording medium, and the third light flux enters into the objective optical element as an almost infinite parallel light flux for information reproducing and/or recording on the third optical information recording medium, and wherein the first phase difference providing structure corrects a spherical aberration of the objective optical element by providing a phase difference to light fluxes with at least two of the wavelengths λ1, λ2, and λ3, and the second phase difference providing structure corrects a spherical aberration of the objective optical element by providing a phase difference to light fluxes with at least two of the wavelengths λ1, λ2, and λ3.

2. The objective element of claim 1, wherein each of the first phase difference providing structure and the second phase difference providing structure is a blaze type diffractive structure.

3. The objective optical element of claim 2, wherein the objective optical element satisfies a following expression, $$5 \times \lambda 1/(n1-1) \leq d1 < 6 \times \lambda 1/(n1-1) \quad (1)$$

wherein n1 is a refractive index for wavelength λ1 of an optical element having the blaze type diffractive structure among the two or more optical elements, and d1 is a step depth of each of the ring-shaped zones whose step is parallel to an optical axis.

4. The objective optical element of claim 2, wherein the objective optical element satisfies a following expression, $$10 \times \lambda 1/(n1-1) \leq d1 < 11 \times \lambda 1/(n1-1) \quad (2)$$

wherein n1 is a refractive index for wavelength λ1 of an optical element having the blaze type diffractive structure among the two or more optical elements, and d1 is a step depth of each of the ring-shaped zones whose step is parallel to an optical axis.

5. The objective optical element of claim 2, wherein the objective optical element satisfies a following expression, $$3 \times \lambda 1/(n1-1) \leq d4 \times \lambda 1/(n1-1) \quad (3)$$

wherein n1 is a refractive index for wavelength λ1 of an optical element having the blaze type diffractive structure among the two or more optical elements, and d1 is a step depth of each of the ring-shaped zones whose step is parallel to an optical axis.

6. The objective optical element of claim 1, wherein the first phase difference providing structure is a blaze type diffractive structure, the second phase difference providing structure is a transmission type diffractive structure, and the second phase difference providing structure is arranged closer to an optical information recording medium than the first phase difference providing structure.

7. The objective optical element of claim 6, wherein the objective optical element satisfies a following expression, $$5 \times \lambda 1/(n1-1) \leq d1 < 6 \times \lambda 1/(n1-1) \quad (4)$$

wherein n1 is a refractive index for wavelength A1 of an optical element having the blaze type diffractive structure among the two or more optical elements, and d1 is a step depth of each of the ring-shaped zones whose step is parallel to an optical axis.

8. The objective optical element of claim 6, wherein the objective optical element satisfies a following expression, $$1 \times \lambda 1 (n1-1) \leq d1 < 2 \times \lambda 1/(n-1) \quad (5)$$

wherein n1 is a refractive index for wavelength A1 of an optical element having the blaze type diffractive structure among the two or more optical elements, and d1 is a step depth of each of the ring-shaped zones whose step is parallel to an optical axis.

9. The objective optical element of claim 6, wherein the objective optical element satisfies a following expression, $$3 \times \lambda 1/(n1-1) \leq d1 < 4 \times \lambda 1/(n1-1) \quad (6)$$

wherein n1 is a refractive index for wavelength λ1 of an optical element having the blaze type diffractive structure among the two or more optical elements, and d1 is a step depth of each of the ring-shaped zones whose step is parallel to an optical axis.

10. The objective optical element of claim 1, wherein each of the first phase difference providing structure and the second phase difference providing structure is a transmission type diffractive structure.

11. The objective optical element of claim 10, wherein the objective optical element satisfies a following expression, $$1 \times \lambda 1/(n1-1) \leq d1 < 2 \times \lambda 1/(n1-1) \quad (8)$$

wherein n1 is a refractive index for wavelength λ1 of an optical element having the blaze type diffractive structure among the two or more optical elements, and d1 is a step depth of each of the ring-shaped zones whose step is parallel to an optical axis.

12. The objective optical element of claim 10, wherein the objective optical element satisfies a following expression, $$3 \times \lambda1/(n1-1) \leq d1 < 4 \times \lambda1/(n1-1) \quad (9)$$

wherein n1 is a refractive index for wavelength λ1 of an optical element having the blaze type diffractive structure among the two or more optical elements, and d1 is a step depth of each of the ring-shaped zones whose step is parallel to an optical axis.

13. The objective optical element of claim 1, wherein at least one of the two or more optical elements is formed of a plastic material.

14. The objective optical element of claim 1, wherein the two or more optical elements are formed of a same material.

15. The objective optical element of claim 1, wherein the two or more optical elements are arranged so that relative interval between the two or more optical elements is constant at the time of use of the optical pickup apparatus.

16. The objective optical element of claim 1, wherein the two or more optical elements are integrated in one body by being adhered through a connecting portion.

17. The objective optical element of claim 1, wherein the objective optical element prevents the third light flux entering outside of a numerical aperture which is necessary for information reproducing and/or recording on the third optical information medium using the third light flux, from converging.

18. The objective optical element of claim 1, wherein λ1≠λ2.

19. The objective optical element of claim 1, wherein λ1 and λ3 satisfy the relationship 1.8×λ1≦λ3≦2.2×λ1.

20. The objective optical element of claim 1, wherein the wavelength λ1 and the wavelength λ3 satisfy 1.8×λ1≦λ3≦2.2×λ1, and the first phase difference providing structure and the second phase difference providing structure correct a spherical aberration of the objective optical element caused by a difference in a wavelength among the first to third light sources or a difference in a thickness of the protective layer among the first to third optical information recording media.

21. An optical pickup apparatus including a first light source emitting a first light flux with a wavelength λ1 for information reproducing and/or recoding, a second light source emitting a second light flux with a wavelength λ2 for information reproducing and/or recording, a third light source emitting a third light flux with a wavelength λ3 for information reproducing and/or recording and a light converging system having an objective optical element, for converging the first light flux on information recording surface of a first optical information recording medium having a protective layer with a thickness t1, the objective optical element comprising at least two optical elements having a first surface including a first phase difference providing structure and a second surface including a second phase difference providing structure, wherein said first and second phase difference providing structures each independently correct a spherical aberration of the objective optical element by providing a phase difference to light fluxes with at least two of the wavelengths λ1, λ2, and λ3, converging the second light flux on information recording surface of a second optical information recording medium having a protective layer with a thickness t2, and converging the third light flux on information recording surface of a third optical information recording medium having a protective layer with a thickness t3, wherein at least two of the first light source, the second light source and the third light source are packaged in one light source unit.

22. The optical pickup apparatus of claim 21, wherein the first optical information recording medium comprises two information recording surface arranged at an interval ΔL along an optical axis, and ΔL satisfies 0.0015 mm ≦ΔL≦0.030 mm.

23. The optical pickup apparatus of claim 21, wherein the second light source emitting the second light flux and the third light source emitting the third light flux are packaged in one light source unit.

24. The optical pickup apparatus of claim 21, wherein the first light source, the second light source and the third light source are packaged in one light source unit.

25. The optical pickup apparatus of claim 19, wherein λ1≠λ2.

26. The optical pickup apparatus of claim 21, wherein λ1 and λ3 satisfy the relationship 1.8×λ1≦λ3≦2.2×λ1.

27. The optical pickup apparatus of claim 21, wherein the wavelength λ1 and the wavelength λ3 satisfy 1.8×λ1≦λ3≦2.2×λ1, and the first phase difference providing structure and the second phase difference providing structure correct a spherical aberration of the objective optical element caused by a difference in a wavelength among the first to third light sources or a difference in a thickness of the protective layer among the first to third optical information recording media.

* * * * *

UNITED STATES PATENT AND TRADEMARK OFFICE
CERTIFICATE OF CORRECTION

| | | |
|---|---|---|
| PATENT NO. | : 7,646,696 B2 | Page 1 of 1 |
| APPLICATION NO. | : 11/075941 | |
| DATED | : January 12, 2010 | |
| INVENTOR(S) | : Kiyono Tateyama | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 883 days.

Signed and Sealed this

Twenty-eighth Day of December, 2010

David J. Kappos
*Director of the United States Patent and Trademark Office*